US012753128B2

(12) United States Patent
Varadachari

(10) Patent No.: US 12,753,128 B2
(45) Date of Patent: Oct. 6, 2026

(54) NITROGEN FERTILIZER COMPOSITIONS BASED ON POLYPHOSPHATE CAGED STRUCTURE

(71) Applicant: Agtec Innovations, Inc., Los Altos, CA (US)

(72) Inventor: Chandrika Varadachari, Kolkata (IN)

(73) Assignee: Agtec Innovations, Inc., Los Altos, CA (US)

( * ) Notice: Subject to any disclaimer, the term of this patent is extended or adjusted under 35 U.S.C. 154(b) by 614 days.

(21) Appl. No.: 18/034,178

(22) PCT Filed: Nov. 21, 2021

(86) PCT No.: PCT/IB2021/060786
§ 371 (c)(1),
(2) Date: Apr. 27, 2023

(87) PCT Pub. No.: WO2022/107085
PCT Pub. Date: May 27, 2022

(65) Prior Publication Data

US 2023/0391684 A1 Dec. 7, 2023

(30) Foreign Application Priority Data

Nov. 23, 2020 (IN) ............................. 202031050833

(51) Int. Cl.
*C05B 13/06* (2006.01)
*C05C 9/00* (2006.01)
(Continued)

(52) U.S. Cl.
CPC .............. *C05B 13/06* (2013.01); *C05C 9/005* (2013.01); *C05D 9/02* (2013.01); *C05G 3/44* (2020.02)

(58) Field of Classification Search
CPC ......... C05B 13/06; C05B 13/00; C05C 9/005; C05C 9/00; C05D 9/02; C05G 3/44; C05G 5/12
See application file for complete search history.

(56) References Cited

U.S. PATENT DOCUMENTS

| | | | |
|---|---|---|---|
| 3,369,885 | A | 2/1968 | Takahashi et al. |
| 3,397,035 | A | 8/1968 | Shen et al. |

(Continued)

FOREIGN PATENT DOCUMENTS

| | | |
|---|---|---|
| CN | 109503236 | 3/2019 |
| IN | 172800 | 4/1993 |

(Continued)

OTHER PUBLICATIONS

Chandra et al., A new slow-releasing iron fertilizer, Chemical Engineering Journal (UK) 155 451-456 2009.

(Continued)

*Primary Examiner* — Jennifer A Smith
(74) *Attorney, Agent, or Firm* — Bryan Cave Leighton Paisner LLP

(57) ABSTRACT

Urea based nitrogenous fertilizers are described which have reduced water solubility. The fertilizers are intended to provide environmental benefits and economic advantages over urea. The fertilizers are a product of reaction of urea with polyphosphates whereby the urea is trapped within the polyphosphate crystal cage. The fertilizers contain nitrogen, phosphorus and one or more of calcium, magnesium and iron. The fertilizers optionally contain other nitrogen compounds and optionally other micronutrients. The fertilizers are granular.

20 Claims, 6 Drawing Sheets

(51) Int. Cl.
*C05D 9/02* (2006.01)
*C05G 3/40* (2020.01)

(56) References Cited

U.S. PATENT DOCUMENTS

| | | | | |
|---|---|---|---|---|
| 3,495,937 | A | 2/1970 | Shen et al. | |
| 3,574,591 | A | 4/1971 | Lyons et al. | |
| 3,578,433 | A | 5/1971 | Bottai et al. | |
| 3,825,414 | A | 7/1974 | Lee et al. | |
| 7,670,405 | B2 | 3/2010 | Varadachari | |
| 7,691,171 | B2 | 4/2010 | Varadachari | |
| 8,216,337 | B2 | 7/2012 | Varadachari | |
| 8,506,670 | B2 | 8/2013 | Varadachari | |
| 8,999,031 | B2 | 4/2015 | Varadachari | |
| 9,017,443 | B2 | 4/2015 | Varadachari | |
| 9,181,137 | B2 | 11/2015 | Varadachari | |
| 9,764,993 | B2 | 9/2017 | Varadachari | |
| 9,932,276 | B2 | 4/2018 | Varadachari | |
| 10,239,797 | B2 | 3/2019 | Varadachari | |
| 2006/0196240 | A1 | 9/2006 | Varadachari | |
| 2007/0095119 | A1 | 5/2007 | Varadachari | |
| 2010/0206032 | A1 | 8/2010 | Varadachari | |
| 2010/0240533 | A1 | 9/2010 | Varadachari | |
| 2012/0024026 | A1 | 2/2012 | Varadachari | |
| 2013/0133387 | A1 | 5/2013 | Varadachari | |
| 2016/0002118 | A1* | 1/2016 | Varadachari | C05B 13/06 71/48 |
| 2023/0391684 | A1 | 12/2023 | Varadachari | |

FOREIGN PATENT DOCUMENTS

| | | |
|---|---|---|
| IN | 175597 | 7/1995 |
| IN | 177205 | 12/1996 |
| IN | 194747 | 6/1999 |
| WO | 2012020427 A1 | 2/2012 |
| WO | 2012020428 A1 | 2/2012 |

OTHER PUBLICATIONS

Bandyopadhyay et al., New Slow-releasing molybdenum fertilizer, Journal of Agricultural & Food Chemistry (USA) 56 1343-1349 2007.

Bhattacharya et al., Development of a novel slow-releasing iron-manganese fertilizer compound, Industrial & Engineering Chemistry Research (USA) 46 2870-2876 2007.

Ray et al., Novel slow-releasing micronutrient fertilizers 2. Copper compounds, Journal of Agricultural & Food Chemistry (USA) 45 1447-1453 1997.

Ray et al., Novel slow-releasing micronutrient fertilizers. 1. Zinc compounds, Industrial & Engineering Chemistry Research (USA) 32 1218-1227 1993.

Patent Cooperation Treaty, International Search Report for PCT/IB2021/060786, 7 pages Mar. 2, 2022.

Ghosh "New Concepts in Fertilizer Development," Journal of Indian Society of Soil Science, vol. 65 (Supplemental) pp. S53-S58 (2015).

Bandyopadhyay et al. "Multimicronutrient Slow-Release Fertilizer of Zinc, Iron, Manganese, and Copper," International Journal of Chemical Engineering, vol. 2014, Article ID 327153, 7 pages.

Varadachari et al. "Zinc Polyphosphate—A Unique Innovation and Game Changer in Soil and Plant Zinc Management," Indian Journal of Fertilisers 20 (4): 398-407, Apr. 2024.

Varadachari et al. "Biorelease Multinutrient Fertilizers for High-altitude Agriculture," Mountain Research and Development, vol. 29, No. 3, Aug. 2009: 241-249.

Saikh et al. "Crop response to a novel bio-release Zn fertilizer in diverse agro-climatic zones of India," Trop. Agric. (Trinidad) vol. 82 No. 4, Oct. 2005, 6 pages.

Varadachari "Phosphoric Acid, Phosphates and Fertilizers for the Future," Proc. Indian Natn Sci Acad. B58 Nos. 2&3 pp. 119-126 (1992).

* cited by examiner (a)

(b)

(c)

(d)

(e)

NITROGEN FERTILIZER COMPOSITIONS BASED ON POLYPHOSPHATE CAGED STRUCTURE

FIELD OF THE INVENTION

The present invention relates generally to fertilizers, and in particular to nitrogen fertilizers with reduced water solubility and reduced environmental polluting impact produced by caging urea within an inorganic crystalline matrix. The invention is to be used as a nitrogen fertilizer for plants. The invention is also to be used for providing supplemental phosphorus nutrition for plants.

DESCRIPTION OF THE RELATED ART

Nitrogen an important plant nutrient and nitrogen fertilizers are generally required in largest dosages compared to all other fertilizer nutrients. Nitrogen is an essential building block of cellular components including amino acids, proteins, enzymes, DNA, etc. Crop yields will drastically reduce without application of nitrogen fertilizers and food shortages will result. Nitrogen fertilization is required for nearly all crops in all soils anywhere in the world.

Currently, the most popular and largest selling fertilizer is urea (carbamide) which has the chemical formula $CO(NH_2)_2$. Other nitrogenous fertilizers commonly used are ammonium sulphate, calcium ammonium nitrate, ammonia and ammonium nitrate. All of these fertilizers have high water solubility.

Water soluble fertilizers such as urea can be removed from the soil by water either by run off over the surface or by leaching through the soil. Water soluble nitrogenous fertilizers are also readily transformed by soil microorganisms to ammonia and nitrogen oxides which volatilize to the atmosphere. Nitrogen oxides (NOx) are potent greenhouse gases and thus considered serious environmental pollutants. Nitrogenous fertilizers are also transformed to nitrates which percolate through the soil into ground water and other water bodies. Nitrates are harmful to human health.

Due to leaching and volatilization losses of nitrogenous fertilizers, their efficiency is low. For example, only about 40% of added urea is actually utilized by the crop. Low utilization of fertilizers is economically undesirable. The farmer loses a considerable amount of his investment in fertilizers and increases economic burden in farming. It is also a huge waste of energy and resources such as oil and natural gas which are required to produce such fertilizers. Thus, there are two major issues, environmental and economical, which are of concern in existing nitrogenous fertilizers.

With the realization that reducing water solubility would reduce this problem and produce fertilizers that is environmentally safe and also effective, various products have been developed that are slow-release or controlled-release. The common factor in all such products is that they have reduced water solubility and release nutrients slowly over time. New materials include membrane encapsulated urea, urea polymers such as ureaform and isobutylidenediurea, sulphur coated urea, neem coated urea, supergranules (Varadachari, C and Goertz, H M, 2010, Slow-release and controlled-release nitrogen fertilizers, *In Regional Assessment of Reactive Nitrogen*, Ed. YP Abrol) Indian Nitrogen Group, New Delhi, 11 1-42). Many of the slow-release fertilizers are expensive and viable only for non-commercial uses like home gardens, lawns, golf courses, etc. Apart from high raw material costs, the major problem with these formulations is that N release occurs by diffusion (through a barrier) or by hydrolysis of polymers. Release rates depend on soil factors such as pH, water content and temperature and thus vary with each soil and they may not match N requirement by the crop. Moreover, each crop has a different requirement pattern that changes with its growth phase. Therefore, hydrolysis or diffusion-controlled materials are not able to satisfactorily provide the required nutrition particularly for short duration intensive crops like rice, wheat, vegetables, etc.

Another group of materials use absorbents such as polyacrylic acid gels to absorb urea and other fertilizers so that they do not get leached out easily (Liang R, Liu M. 2006. Preparation and properties of coated nitrogen fertilizer with slow release and water retention. Ind. Eng. Chem. Res. 45: 8610-8616). These authors describe a gel produced from cross-linked poly(acrylic acid)/organo-attapulgite, urea-formaldehyde and urea granule. Absorption within synthetic gels has the disadvantage of introducing non-biodegradable polymers such as polyacrylates in the soil. For this reason, more environment-friendly absorbents have also been developed as carriers of urea. Other absorbent materials used include zeolite a natural silicate (http://zeoponix.com/). Zeolite is also non-degradable and will add to the soil residue thereby changing its properties over time.

Ideally, a substance that is degradable and does not have any residual effects in the soil would be a good substrate. Polyphosphates of calcium, magnesium, iron, ammonium and potassium have the property of being soluble in dilute organic acids (such as citric acids) and the chemical constituents are all plant nutrients. The chemical composition of the polyphosphates suggests that it has a molecular structure that allows water molecules to be trapped. This invention uses the polyphosphate salts as a molecular cage for trapping urea and thereby producing a slow releasing source of nitrogen for crops.

OBJECT OF THE INVENTION

The principal objective of the present invention is to produce nitrogen fertilizers which have reduced water solubility and high nutrient availability. Another objective is to provide nitrogen compounds having reduced environmental impact by reducing ammonia volatilization and reduced nitrification. A further objective is to produce a fertilizer that will be biodegradable and will not leave any harmful residues in the soil. Another objective of the invention is to improve fertilizer efficiency by reducing dosage requirement without reducing yields of crops. Yet another objective of the invention is to produce a fertilizer that will be economical, by way of producing it raw materials that are relatively low cost and commonly used in fertilizer industry.

Principle Underlying the Invention

Inorganic nitrogen compounds are generally water soluble. To reduce its environmental impact, reduce wastage and improve nitrogen fertilizer efficiency, it is required to reduce the water solubility of the compound. Cost of product is an also important factor since farming margins are small and farmers cannot afford to use very expensive products. In order to achieve these objectives, the present invention utilizes the principle of trapping urea molecules within an inorganic macromolecule that is biodegradable so as to reduce its accessibility to water molecules and thereby reduce solubility and also ensure that the urea becomes readily available to plants over a period of time. The advantage of using urea is that it can substitute for water molecules. One suitable macromolecular structure for chemically trapping urea is provided by polyphosphates. Polyphosphates are produced from phosphoric acid which is a fertilizer raw material and is also a nutrient in itself. Therefore, it will not produce any undesirable residual materials unlike organic polymers like acrylic gels. Also, short chain polyphosphates have considerable amounts of structural water. Supramolecular structures that contain trapped water molecules can substitute urea for water and thus form a cage for urea.

This invention is based on the principle that urea molecules can be substituted for structural water molecules in the macromolecular crystals of polyphosphates, particularly calcium or magnesium polyphosphates. Some of the amide groups (NH 2) of urea could also react with free hydrogen phosphate groups (P—OH groups) by transfer of proton from the P—OH to $NH_2$ of urea, forming linkages of the type $P—O^-—^+H_3N—CO—NH_2$. Both these mechanisms would reduce the solubility of urea. Thereby, a chemical form of a urea-polyphosphate entity would be produced that would reduce the solubility of urea.

If urea were to be trapped in a non-biodegradable crystal structure, a considerable amount would never be available to plants because it would never come into solution. However, this invention uses a biodegradable polyphosphate. The polyphosphate is soluble in dilute acids like citric acid, DTPA or EDTA which simulate plant root acid dissolution capacity and bioavailability of the compound. When urea is combined with polyphosphate, a part of it which is soluble would be immediately available to the plant; another part would remain combined with the crystal structure and become available over time as the polyphosphate structure degrades under the influence of root organic acids.

SUMMARY OF THE INVENTION

In accordance with various illustrative embodiments hereinafter described, are urea based fertilizer compounds obtained by reacting urea with polyphosphates, and having optionally one nitrogen compound selected from the group consisting of ammonium sulphate, ammonium chloride, ammonium carbonate, ammonium nitrate, calcium ammonium nitrate, potassium nitrate, urea formaldehyde polymers such as methylene urea, dimethylenetriurea; the polyphosphate compound having of one or more of the elements calcium, magnesium, iron and optionally one of more of the elements potassium, zinc, manganese, copper, boron, molybdenum. The fertilizer compounds have nitrogen with reduced water solubility, are soluble in dilute acids, and are granular.

Another aspect of the present invention is a fertilizer composition in solid form, the fertilizer comprising a chemical composition of urea and polyphosphate in a chemical combination produced by displacement of structural water molecules from the polyphosphate crystal structure by urea molecules, and bonding between urea and hydrogen phosphate, resulting in a new chemical entity wherein the urea has reduced water solubility. The composition includes 15% to 43% by weight of nitrogen as N, 40% to 93% by weight urea, 1% to 15% by weight of phosphorus, 0.5% to 7% by weight of either or all of calcium, magnesium and iron. The polyphosphate is short chain with number average chain length of the phosphate when all orthophosphate and polyphosphate phosphorus is included, is between 1.2 and 10 repeat units. The composition optionally includes starch to improve the combination of urea with polyphosphate. The composition optionally includes one or more of the elements potassium, zinc, manganese, copper, boron, molybdenum and optionally one or more binders to enhance granulation. Exemplary binders include bentonite, starch, cellulose and its derivatives, dextrin and its derivatives, polyvinyl acetates, polyvinyl acetate copolymers, polyvinyl alcohols, alginate, gelatins, lignosulfonates, acrylates, acrylamides, polysaccharides. The composition is granular with average size of particles greater than 1 mm.

Among the various aspects of the present invention is a urea-polyphosphate composition having urea and polyphosphates wherein the urea has reduced solubility. The urea-polyphosphate composition includes urea with reduced water solubility, water insoluble, citric acid soluble polyphosphates, and one or more cations selected from calcium, magnesium, ammonium, potassium and iron. The urea-polyphosphate composition optionally includes crosslinking promoters selected from starch, cellulose derivatives, polysaccharides, polyalcohols. A fertilizer comprising the urea-polyphosphate composition optionally includes nitrogen compounds selected from the group consisting of ammonium sulphate, ammonium chloride, ammonium carbonate, ammonium nitrate, calcium ammonium nitrate, potassium nitrate, urea formaldehyde polymers such as methylene urea, dimethylenetri urea, triazones, crotonylidenedi urea, isobutylidenedi urea. A fertilizer comprising the urea-polyphosphate composition optionally includes one of more of the elements potassium, zinc, iron, manganese, copper, boron, molybdenum, sulfur. A fertilizer comprising the urea-polyphosphate composition optionally includes inorganic binders selected from sulfates, chlorides, nitrates of ammonium and potassium, bentonite, and organic binders selected from starch, cellulose and its derivatives, dextrin and its derivatives, polyvinyl acetates, polyvinyl acetate copolymers, polyvinyl alcohols, alginate, gelatins, lignosulfonates, acrylates, acrylamides, polysaccharides, acrylates and gums. The fertilizer comprising the urea-polyphosphate composition optionally includes one or more urease inhibitors and nitrification inhibitors selected from NBPT, DCD, DMPP, nitrapyrin, neem oil composition. The fertilizer comprising the urea-polyphosphate composition is granular.

Another aspect of the present invention is a urea-polyphosphate composition in solid form, the fertilizer containing urea with reduced solubility where no more than 80 wt. % of the urea is released, when 5 g placed on a filter paper in a funnel is leached with mL water in a period of 10 min. Preferably no more than 30 to 60 wt. % of the urea is released. Optionally, the composition may contain other nitrogen compounds in addition to urea. When other nitrogen compounds are present, the percentage of soluble nitrogen with respect to the total nitrogen will not exceed 80%. Preferably, the percentage of soluble nitrogen with respect to the total nitrogen will be 40 to 60%.

Another aspect of the present invention is a fertilizer, which is soluble in 2 wt. % citric acid. The urea-polyphosphate composition will release at least 80 wt % of the urea when in 2 wt % citric. Preferably, the citric acid soluble urea will be more than 90%. When other nitrogen compounds are present, the percentage of 2 wt. % citric acid soluble nitrogen with respect to the total will be at least 80%. Preferably, the percentage of citric soluble nitrogen with respect to the total nitrogen will be over 90%.

Another aspect of the present invention is a urea-polyphosphate composition in solid form, which is soluble in 2 wt. % citric acid. The urea-polyphosphate composition will release at least 70 wt % each of the urea and phosphorus in 2 wt % citric. Preferably, the citric acid soluble urea and phosphate will be more than 90%. The urea-polyphosphate composition will release at least 50 wt % each of the urea in 0.2 wt % citric. Preferably, the percentage of 0.2% citric soluble nitrogen with respect to the total nitrogen will be over 90% and the percentage of 0.2% citric acid soluble phosphorus will be at least 80% of the total phosphorus.

Another aspect of the present invention is a urea-polyphosphate composition comprising urea, a polyphosphate, inorganic cations, and a water-insoluble fraction having (a) a nitrogen content in the range of 5 wt % to 40 wt %, (b) a phosphorus content in the range of 1 wt % to 20 wt. %, (c) primary inorganic cations in the range of 1 wt % to wt % wherein the inorganic cations are selected from the group consisting of ammonium, calcium, iron, magnesium, and potassium cations and combinations thereof, (d) a molar ratio of nitrogen to the combined total of the primary inorganic cations in the range of 2:1 to 40:1, (e) a number average chain length of polyphosphate groups of 1.1 to when orthophosphates are included in the number average chain length calculation, (f) a molar ratio of nitrogen to phosphorous in the range of 3:1 to 60:1, and (g) a solubility in citric acid such that (i) at least 70 wt. % of each of the total nitrogen and total phosphorous in the water-insoluble fraction is soluble in 2 wt. % citric acid, and (ii) at least 50 wt. % of each of the total nitrogen and the total phosphorous in the water-insoluble fraction is soluble in 0.2 wt. % citric acid.

The water-insoluble fraction is obtained by placing 2 g of the urea-polyphosphate composition on a filter paper in a funnel over a Whatman 1 filter paper, leaching with 10 mL deionized water added drop wise from a burette for 8 minutes at 25° C. and collecting the solid residue. The water-insoluble fraction contains at least 5 wt % water-insoluble urea and preferably between 30 wt % and 60 wt. % insoluble urea. The water-insoluble fraction contains at least 70% of total urea soluble in 0.2% citric acid. The water-insoluble fraction contains polyphosphate with number average chain length of polyphosphate groups between 1.1 and 20 when orthophosphates are included in the calculation. The water-insoluble fraction includes primary inorganic cations selected from calcium, magnesium, ammonium, potassium and iron and comprising between 1 wt. % and 20 wt. %. The water-insoluble fraction optionally includes the elements zinc, manganese, copper, boron, molybdenum, selenium, potassium, sulfur comprising up to 10% by weight. A fertilizer composition comprising the urea-polyphosphate composition optionally includes less than 15% by weight of one or more cross-linkage promoters containing hydroxyl groups, selected from starch, polysaccharides, polyalcohols, natural gums. A fertilizer composition comprising the urea-polyphosphate composition optionally includes one or more nitrogen compounds selected from the group consisting of ammonium sulphate, ammonium chloride, ammonium carbonate, ammonium nitrate, calcium ammonium nitrate, potassium nitrate, urea formaldehyde polymers such as methylene urea, dimethylenetri urea; A fertilizer composition comprising the urea-polyphosphate composition optionally contains one or more phosphate compounds selected from the group consisting diammonium phosphate, monoammonium phosphate, calcium phosphate, magnesium phosphate. A fertilizer composition comprising the urea-polyphosphate composition optionally includes one or more of the elements potassium, sulfur, zinc, manganese, copper, boron, molybdenum and optionally one or more inorganic or organic binders selected from sulfates, chlorides, nitrates of ammonium and potassium, bentonite, starch, cellulose and its derivatives, dextrin and its derivatives, polyvinyl acetates, polyvinyl acetate copolymers, polyvinyl alcohols, alginate, gelatins, lignosulfonates, acrylates, acrylamides, polysaccharides. The composition is granular with average size of particles greater than 1 mm.

Another aspect of the present invention is a urea-calcium polyphosphate complex having at least 20% by weight of nitrogen from urea, and is characterized by having X-ray diffraction (XRD) reflections at one or more of the following positions: 25.39 (broad band), 3.97 (±0.02), 3.94 (±0.02), 3.91 (±0.02), 3.55 (±0.01), 3.3 (±0.01), 3.01 (±0.01), 3.0 (±0.009), 2.92 (±0.009), 2.79 (±0.008), 2.49 (±0.007), 2.4 (±0.007), 2.21 (10.005), 2.15 (±0.005), 2.03 (±0.005), 1.98 (±0.004), 1.83 (±0.004), 1.71 (±0.003), 1.66 (±0.0027) Angstrom.

Another aspect of the present invention is a urea-polyphosphate composition wherein the urea content in the water-insoluble fraction is at least 10 wt. %, with molar rations of N:P between 3:1 and 60:1, the urea-polyphosphate comprising at least 1 wt. % phosphorus as water insoluble, 2% citric acid soluble phosphorus, wherein the urea-polyphosphate composition is characterized by having X-ray diffraction reflections at one or more of the following values of 2θ and d-spacings with error range of 2θ of ±0.005°: [11.165°, 7.9205 Å], [11.625°, 7.6081 Å, [12.795°, 6.9149 Å], [13.165°, 6.7214 Å], [22.355°, 3.9747 Å], [22.575°, 3.9365 Å], [22.725°, 3.9109 Å], [24.975°, 3.5634 Å], [26.735°, 3.3327 Å], [29.615°, 3.0148 Å], [29.765°, 2.9999 Å], [30.595°, 2.9204 Å], [32.005°, 2.7949 Å], [35.915°, 2.4991 Å], [37.505°, 2.3967 Å], [40.875°, 2.2066 Å], [41.935°, 2.1532 Å], [42.015°, 2.1493 Å], [44.675°, 2.0273 Å], [45.695°, 1.9844 Å], [49.905°, 1.8264 Å], [53.555°, 1.7102 Å], [55.305°, 1.6602 Å].

In accordance with another illustrative embodiment, a method of producing a fertilizer comprising a nitrogen composition is provided. The method comprising (a) combining phosphoric acid, optionally preheated, with at least one of the metals calcium, magnesium and iron and optionally one or more elements from potassium, zinc, manganese, copper, boron and molybdenum (b) heating to a temperature between 70° C. and 160° C. to produce a polyphosphate, (c) discontinuing the heating, (d) adding water to the polymerized mixture (e) neutralizing the polymerized mixture with a neutralizing base, (f) drying the neutralized product and grinding it to form a powder (g) heating urea, optionally with added water, till it is molten and optionally adding starch to the molten mass, (h) adding the polyphosphate powder from stage (f) to the molten urea of stage (g), discontinuing the heating and grinding the mass to form a powder and finally granulating the powder from stage (h).

In accordance with another illustrative embodiment, a process for the preparation of a urea-polyphosphate composition or a fertilizer composition is provided, the process comprising forming a polyphosphate powder and reacting the polyphosphate powder with urea, wherein (1) forming the polyphosphate powder comprises (a) combining phosphoric acid, optionally preheated up to 150° C., with at least one of the metals calcium, magnesium, iron, potassium and ammonium and optionally one or more elements from zinc, manganese, copper, boron, molybdenum and selenium to form a reaction mixture, (b) heating the reaction mixture to a temperature in the range of 70° C. to 160° C. to produce a polyphosphate intermediate, (c) adding water to the reaction mixture to quench the polymerization reaction, (e) neutralizing the polyphosphate intermediate with a neutralizing base to form a polyphosphate product, (f)

drying and grinding the polyphosphate product to form a polyphosphate powder, and (2) reacting the polyphosphate powder with urea comprises (g) forming a molten mass comprising urea and optionally water, (h) optionally adding starch to the molten mass, (i) combining the polyphosphate powder and the molten mass to form a urea-polyphosphate reaction mixture, (j) heating the urea-polyphosphate reaction mixture to a temperature in the range of 120° to 130° C. to form a urea-polyphosphate product, (k) cooling the urea-polyphosphate product, and (l) grinding the cooled urea-polyphosphate product to form the urea-polyphosphate composition.

The process additionally comprises extracting the urea-polyphosphate composition with water to remove soluble urea from the urea-polyphosphate composition, drying the extracted urea-polyphosphate composition, and powdering the dried urea-polyphosphate composition. The urea-polyphosphate composition is granulated by spraying the urea-polyphosphate composition with water optionally containing a binding agent, and granulating the sprayed urea-polyphosphate composition in a granulator.

DETAILED DESCRIPTION OF THE PREFERRED EMBODIMENTS

The present invention is directed to complex urea products formed by trapping urea within and combining with macromolecular polyphosphate crystal structure. Without wishing to bound by theory, the Applicant believes that complex urea products are produced in this invention when urea is reacted with polyphosphate so that the two produce an integrated structure. Without further wishing to bound by theory, the Applicant believes that small chain polyphosphates that contain significant amounts of structural water can substitute urea for water molecules. Such water molecules are tightly bound, similar to water of crystallization in inorganic salts. Additionally, urea can also bind to free OH groups of the P—OH in the structure by exchange of $H^+$ ion from P—OH of polyphosphate to $NH_2$ of urea followed by formation of an electrostatic bond which may be represented as $$\text{polyphosphate-P—O}^-\text{—}^+\text{NH}_3\text{—CO—NH}_3{}^+\text{—}^-\text{O—P-polyphosphate.}$$

This provides for crosslinking between urea molecules and polyphosphate chains. Addition of starch further enhances the retention of urea within the polyphosphate. There could also be elimination of one mole of $H_2O$ by combination of OH group of polyphosphoric acid with the $NH_2$ group of urea with the formation of a bond as represented by Polyphosphate-OH+$NH_2$—CO—$NH_2$→Polyphosphate-P—NH—CO—NH-Polyphosphate Starch could improve urea retention by promoting cross linkages with polyphosphate by way of OH groups of starch linking to P—OH groups of polyphosphate as well as the $NH_2$ groups of urea thereby forming a bridge. The product after the reaction of urea with polyphosphate, optionally with added starch, when cooled forms a solid mass which is powdered. The powder is then granulated.

Figure 1:
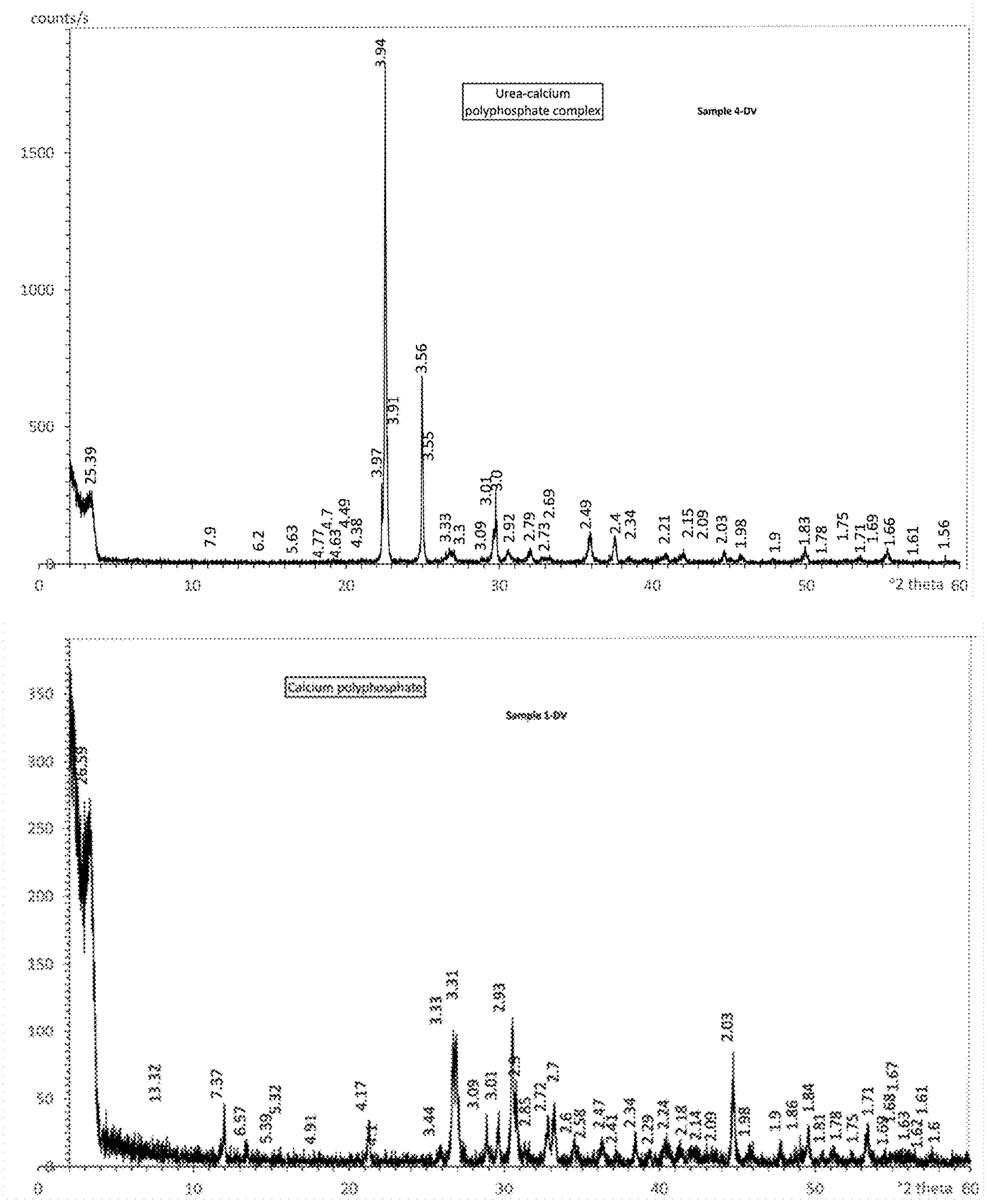
FIG. 1: XRD of urea-calcium polyphosphate product (Example 1), calcium polyphosphate by itself and urea by itself.
Figure 1:
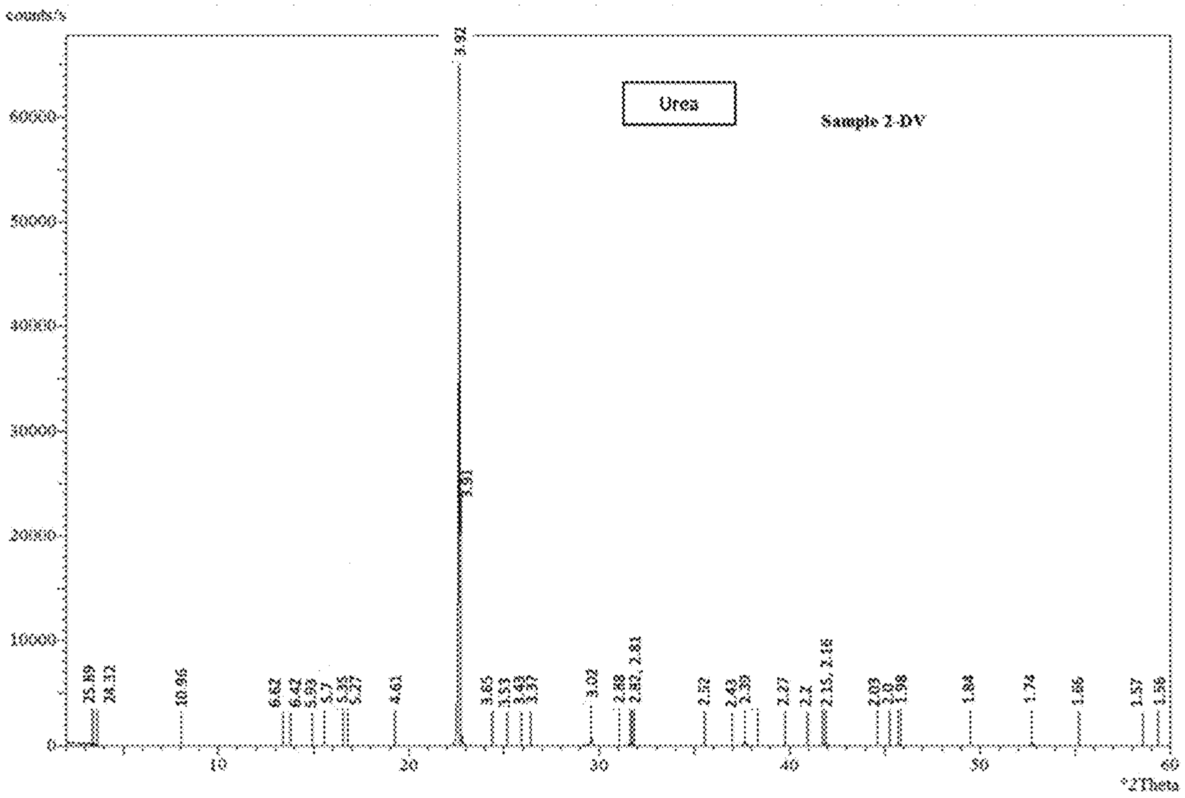

Reaction between polyphosphate crystal and urea to produce a new chemical structure is evidenced by the changes in XRD reflections of the polyphosphate after reaction with urea (FIG. 1). This is seen from a comparison of the urea-calcium polyphosphate reaction product with calcium polyphosphate by itself and urea by itself. The major peaks of the urea-calcium polyphosphate reaction product are at 3.97 Å (±0.02), 3.94 Å (10.02), 3.91 Å(±0.02), 3.55 Å (10.01), 3.3 Å (10.01), 3.01 Å (10.01), 3.0 Å (±0.009), 2.92 Å(±0.009), 2.79 Å (10.008), 2.49 Å (±0.007), 2.4 Å (±0.007), 2.21 Å (±0.005), 2.15 Å (±0.005), 2.03 Å (±0.005), 1.98 Å (±0.004), 1.83 Å (±0.004), 1.71 Å (±0.003), 1.66 Å (±0.0027) Angstrom. The calcium polyphosphate by itself showed major XRD reflections at 7.37 Å (±0.03), 6.57 Å (±0.03), 4.17 Å (±0.02), 3.44 Å (±0.01), 3.33 Å (±0.01), 3.31 Å (±0.01), 3.09 Å (±0.01), 3.01 Å (±0.009), 2.93 Å (±0.009), 2.9 Å (±0.009), 2.72 Å (±0.009), 2.7 Å (±0.009), 2.6 Å 2.58 Å 2.47 Å 2.41 Å, 2.34 Å 2.29 Å 2.24 Å 2.18 Å 2.14 Å 2.03 Å 1.98 Å 1.9 Å 1.86 Å 1.84 Å 1.81 Å, 1.78 Å, (±0.006) 1.75 Å (±0.003), 1.71 Å (±0.003), 1.68 Å (±0.0028), 1.67 Å (±0.0027), 1.6 Å (±0.0025) Angstrom. Major XRD peaks of urea are at 3.92 Å (±0.02), 3.91 Å (±0.02), 3.02 Å (±0.01)] Angstrom. The only peaks common to the polyphosphate and its complex with urea are at 3.31, 3.01, 2.93, 2.03, 1.98 Angstrom. The evidence of new peaks is due to a new crystal structure. There is evidence of free urea in this structure (the water soluble fraction of this fertilizer) in the peaks of urea shown by the fertilizer product. Thereby, the fertilizer composition is a combination of a urea-polyphosphate complex together with free urea.

Reaction between polyphosphate crystal and urea to produce a new urea-polyphosphate composition is also evidenced by the changes in XRD reflections of the polyphosphate after reaction with urea (Table 3) from a comparison of the urea-calcium polyphosphate composition with calcium polyphosphate coated on urea (Example 24); the product of Example 24 is merely a physical combinations of urea and calcium polyphosphate and is not expected to have reacted to any significant extent. The product of Example 24 (produced according to prior art, U.S. Pat. No. 8,999,031) shows only a single strong peak at around 3.99 Å (22.262°); this peak may be attributed to free urea. All other peaks shown by this sample is weak, with relative intensities<10. The urea-polyphosphate composition sample of this invention shows several strong peaks with relative intensities >10. The strongest peak is at 3.9365 Å (22.575°); this is clearly at a different position from that for Example 24. The error range in the XRD reflections corresponds to a 2θ of ±0.005°. Other reflections unique to the urea-polyphosphate composition of Example 4a of this patent are at values of 20 and d-spacings: [11.165°, 7.9205 Å], [11.625°, 7.6081 Å, [12.795°, 6.9149 Å], [13.165°, 6.7214 Å], [22.355°, 3.9747 Å], [22.575°, 3.9365 Å], [22.725°, 3.9109 Å], [24.975°, 3.5634 Å], [26.735°, 3.3327 Å], [29.615°, 3.0148 Å], [29.765°, 2.9999 Å], [30.595°, 2.9204 Å], [32.005°, 2.7949 Å], [35.915°, 2.4991 Å], [37.505°, 2.3967 Å], [40.875°, 2.2066 Å], [41.935°, 2.1532 Å], [42.015°, 2.1493 Å], [44.675°, 2.0273 Å], [45.695°, 1.9844 Å], [49.905°, 1.8264 Å], [53.555°, 1.7102 Å], [55.305°, 1.6602 Å].

Further evidence for the production of a new urea-polyphosphate composition is obtained from thermal analysis data (DSC). A significant change in the endothermic energies for volatilization and reaction is evidenced from DSC data (Table 4). The peak at around 141° C. has an energy of −2.721 mW/mg for the urea-polyphosphate complex of this invention; the comparative values for the products from example 24, which is a product produced according to prior art invention (U.S. Pat. No. 8,999,031) is significantly lower at −1.459 mw/mg. This endotherm is produced by evaporation of absorbed water and volatilization of urea. The differences in the endotherm energies can be attributed to stronger bonding of the urea held within the urea-polyphosphate composition compared to that in the coated material (Example 24). The second peak at around 230° to 250° C. shows larger differences between the products. The endotherm peak energy is −4.418 mW/mg for the urea-polyphosphate composition of this invention, whereas it is −2.578 mW/mg for the product of the prior art (Example 24). The endotherm at this temperature is due to the thermal decomposition of urea and its byproducts. The area under the curves (that indicate total energy required for the reactions) is also much larger for the product of this invention. Higher energy requirements for this reaction indicates stronger bonding with the polyphosphate structure leading to stabilization of the urea molecules. The third peak at above 400° C. shows more pronounced differences, particularly in the total energy for the endotherm. This suggests that a significant proportion of the urea is strongly bound and requires much higher energies to decompose.

In general, the nitrogen fertilizer composition will contain at least 15 wt. % nitrogen. Although the nitrogen fertilizer composition may contain as much as 43 wt. % nitrogen it is generally preferred that the composition contains 30 to 40 wt. % nitrogen. More preferably, the composition contains 30 to 35 wt. % nitrogen. The fertilizer composition will contain at least 40 wt. % urea. Although the composition may contain as much as 90 wt. % urea it is generally preferred that the composition contains 65 to 85 wt. % nitrogen. More preferably, the composition contains 65 to 75 wt. % urea. The fertilizer composition will also contain at least 1 wt. % phosphorus. Although the composition may contain as much as 15 wt. % phosphorus it is generally preferred that the composition contains 4 to 8 wt. % phosphorus. The phosphorus in the composition will contain orthophosphate and short-chain polyphosphate. Orthophosphate content will be at least 5 wt. % of the total phosphorus and will generally be less than 80 wt. % of the total phosphorus. More preferably the composition will contain 30 to 60 wt. % of the total phosphorus as orthophosphate. The composition will also contain short-chain polyphosphates of number average chain length not more than 20 repeat phosphorus units. More preferably the composition will contain polyphosphates of 2 to 10 repeat phosphorus units. The number average chain length of the phosphate when all orthophosphate and polyphosphate phosphorus is included will not exceed 10 repeat units and more preferably will be between 1.2 and 5 repeat units. The polyphosphate will contain one or more of the metals, calcium, magnesium and iron. The fertilizer composition will contain at least 0.5 wt. % of one or more of calcium, magnesium and iron. Although the composition may contain as much as 7 wt. % of anyone or more of calcium, magnesium and iron, preferably the composition will contain 1.0 to 4 wt. % of anyone or more of calcium, magnesium and iron.

The urea-polyphosphate composition will contain at least 5 wt. % nitrogen. Although the nitrogen fertilizer composition may contain as much as 40 wt. % nitrogen, it is generally preferred that the urea-polyphosphate composition contains 10 to 30 wt. % nitrogen. In some embodiments it is preferred that the urea-polyphosphate composition contains 20-30 wt. % nitrogen. In some embodiments it is preferred that the urea-polyphosphate composition contain 10-20 wt. % nitrogen. The urea-polyphosphate composition will contain at least 40 wt. % urea. Although the urea-polyphosphate composition may contain as much as 90 wt. % urea it is generally preferred that the urea-polyphosphate composition contains 60 to 85 wt. % urea. More preferably, the urea-polyphosphate composition contains 65 to 75 wt. % urea. In other embodiments it is preferred that the urea-polyphosphate composition contains 30-50 wt. % urea.

The fertilizer composition will contain urea with reduced water solubility. In general, the water solubility of the urea will be such that the no more than 80 wt. % of the urea is released, when 5 g placed on a filter paper in a funnel is leached with 20 mL water in a period of 10 min. Preferably no more than 30 to 60 wt. % of the urea is soluble. More preferably no more than 30 to 50 wt. % of urea is soluble.

The urea-polyphosphate composition will contain water soluble urea. In general, the water solubility of the urea will be such that the no more than 80 wt. % of the urea is released, when 2 g of the urea-polyphosphate composition placed on a filter paper in a funnel over a Whatman 1 filter paper is leached with 10 mL deionized water added drop-wise from a burette for 8 minutes at 25° C. and the filtrate is collected. Preferably the content of soluble urea in the urea-polyphosphate composition is between 5 wt. % and 95 wt. % of the total urea urea-polyphosphate composition. It is preferred that the soluble urea content of the urea-polyphosphate composition is within 30 to 50 wt. % of the total urea. In some embodiments it is preferred that the soluble urea content of the urea-polyphosphate composition is within 25 to 40 wt. % of the total urea. In some other embodiments the content of soluble urea content of the urea-polyphosphate composition is within 10 to 40 wt. % of the total urea.

The urea-polyphosphate composition will contain water insoluble urea. Of the total urea, more than 5 wt. % is insoluble when 2 g of the urea-polyphosphate composition placed on a filter paper in a funnel over a Whatman 1 filter paper is leached with 10 mL deionized water added drop-wise from a burette for 8 minutes at 25° C. and the residue is collected. Generally, the content of water-insoluble urea in the urea-polyphosphate composition will be less than 95 wt. % of the total urea. Generally, the urea-polyphosphate composition will contain at least 10 wt. % of the total urea as water-insoluble urea. It is preferred that the urea-polyphosphate composition contains at least 20 wt. % of the total urea as water-insoluble urea. In other embodiments the urea-polyphosphate composition contains 20 wt. % to 70 wt. % of the total urea as water-insoluble urea. It is most preferred that the urea-polyphosphate composition contains 30 wt. % to 80 wt. % of the total urea as water-insoluble urea. In some embodiments, the urea-polyphosphate composition contains 50 wt. % to 90 wt. % of the total urea as water-insoluble urea.

The urea-polyphosphate composition will contain water-insoluble phosphorus. The urea-polyphosphate composition will contain at least 1 wt. % water-insoluble phosphorus. Although the urea-polyphosphate composition may contain as much as 20 wt. % water-insoluble phosphorus it is generally preferred that it contains 4 to 8 wt. % water-insoluble phosphorus. In some embodiments the phosphorus content in the water-insoluble fraction is the range of 4 to 13 wt. %. In other embodiments, the water-insoluble phosphorus content in the urea-polyphosphate composition is in the range of 20 wt % and 30 wt. % of the urea-polyphosphate composition. In some other embodiments the phosphorus content in the water-insoluble fraction is the range of 10 wt. % and 20 wt. %. The water-insoluble phosphorus in the composition will contain orthophosphate and short-chain polyphosphate. Orthophosphate content will be at least 5 wt. % of the total water-insoluble phosphorus and will generally be less than 80 wt. % of the total water-insoluble phosphorus. More preferably the urea-polyphosphate composition will include 30 to 60 wt. % of the total water-insoluble phosphorus as orthophosphate. The urea-polyphosphate composition will also include water-insoluble short-chain polyphosphates of number average chain length not more than 20 repeat phosphorus units. More preferably the water-insoluble fraction of the urea-polyphosphate composition will include water-insoluble polyphosphates of 2 to 10 repeat phosphorus units. The number average chain length of the water-insoluble phosphate when all orthophosphate and polyphosphate phosphorus is included will not exceed 10 repeat units and more preferably will be between 1.2 and 5 repeat units.

The water-insoluble fraction of the urea-polyphosphate composition is soluble in dilute citric acid. The water-insoluble fraction of the urea-polyphosphate composition has a solubility in citric acid such that (i) at least 70 wt. % of each of the total nitrogen and total phosphorous in the water-insoluble fraction is soluble when 50 mg of the urea-polyphosphate composition placed in a funnel over a Whatman 1 filter paper, is leached with 50 mL 2 wt. % citric acid added dropwise from a burette for 20 minutes at 25° C. It is most preferred that the water-insoluble fraction of the urea-polyphosphate composition has a solubility in citric acid such that at least 98% of each of the total nitrogen and total phosphorous in the water-insoluble fraction is soluble in 2 wt. % citric acid. In some embodiments the water-insoluble fraction of the urea-polyphosphate composition has a solubility in citric acid such that at least 90% of each of the total nitrogen and total phosphorous is soluble in 2 wt. % citric acid. In other embodiments the water-insoluble fraction of the urea-polyphosphate composition has a solubility in 2 wt. % citric acid such that at least 80% of each of the total nitrogen and total phosphorous is soluble.

The water-insoluble fraction of the urea-polyphosphate composition is soluble in dilute citric acid of strength 0.2 wt. %. The urea-polyphosphate composition has a solubility in citric acid such that (i) at least 50 wt. % of each of the total nitrogen and total phosphorous is soluble when 50 mg of the urea-polyphosphate composition placed on a filter paper in a funnel over a Whatman 1 filter paper, is leached with 50 mL 0.2 wt. % citric acid added dropwise from a burette for 20 minutes at 25° C. It is most preferred that the water-insoluble fraction of the urea-polyphosphate composition has a solubility in citric acid such that at least 80% of each of the total nitrogen and total phosphorous is soluble in 0.2 wt. % citric acid. In some embodiments the water-insoluble fraction of the urea-polyphosphate composition has a solubility in citric acid such that at least 70% of each of the total nitrogen and total phosphorous is soluble in 0.2 wt. % citric acid. In other embodiments the water-insoluble fraction of the urea-polyphosphate composition has a solubility in 0.2 wt. % citric acid such that at least 90% of each of the total nitrogen and total phosphorous is soluble.

The water-insoluble fraction of the urea-polyphosphate composition includes primary inorganic cations. The primary inorganic cations include one or more of the primary inorganic cations, ammonium, calcium, iron, magnesium, and potassium and iron. The water-insoluble fraction of the urea-polyphosphate composition contains primary inorganic cations in the range of 1 wt. % and 20 wt. %. It is preferred that the water-insoluble fraction of the urea-polyphosphate contains primary inorganic cations in the range of 5 wt. % to 15 wt. %. In other embodiments the primary inorganic cations in the water-insoluble fraction of the urea-polyphosphate composition is in the range of 10 wt. % to 15 wt. %. In yet other embodiments the primary inorganic cations in the water-insoluble fraction of the urea-polyphosphate composition is in the range of 5 wt. % to 10 wt. %. The water-insoluble fraction of the urea-polyphosphate composition preferably contains primary inorganic cations selected from the group consisting of calcium, magnesium and iron. In other embodiments it is preferred that the primary inorganic cations in the water-insoluble fraction of the urea-polyphosphate composition fraction are calcium and iron.

The molar ratio of nitrogen to the combined total of the primary inorganic cations (M) in the water-insoluble fraction of the urea-polyphosphate composition is range of 2:1 to 40:1. In some embodiments, the molar ratio of nitrogen to the combined total of the primary inorganic cations (M) in the water-insoluble fraction of the urea-polyphosphate composition is between 20:1 and 40:1. It is preferred that the molar ratio of N:M in the water-insoluble fraction of the urea-polyphosphate composition is between 10:1 and 15:1. In yet other embodiments, the molar ratio of N:M in the water-insoluble fraction of the urea-polyphosphate composition is between 3:1 and 15:1. It is most preferred that the molar ratio of N:M in the water-insoluble fraction of the urea-polyphosphate composition is between 6:1 and 15:1.

The molar ratio of nitrogen to phosphorus (N:P) in the water-insoluble fraction of the urea-polyphosphate composition is range of 3:1 to 60:1. In some embodiments, the molar ratio of nitrogen to phosphorus (N:P) in the water-insoluble fraction of the urea-polyphosphate composition is between 2:1 and 15:1. It is preferred that the molar ratio of N:P in the water-insoluble fraction of the urea-polyphosphate composition is between 4:1 and 14:1. In other embodiments the molar ratio of nitrogen to phosphorous in the water-insoluble fraction of the urea-polyphosphate composition is in the range of 4:1 to 8:1. In yet other embodiments, the molar ratio of N:P in the water-insoluble fraction of the urea-polyphosphate composition is between 8:1 and 10:1.

A fertilizer composition comprising the urea-polyphosphate composition additionally includes a cross-linking promoter containing hydroxyl groups selected from the group consisting of polysaccharides, cellulose derivatives, polyalcohols, natural gums, and combinations thereof and the content of cross-linking promoter is less than 15 wt. % of the urea-polyphosphate composition. When the fertilizer comprising the urea-polyphosphate composition additionally comprises a cross-linking promoter, it is preferred that the cross-linking promoter is starch. When starch is the cross-linking promoter it is preferred that starch constitutes less than 10 wt. % of the urea-polyphosphate composition and preferably between 3 wt. % and 7 wt. % of the urea-polyphosphate composition.

The water-insoluble fraction in the urea-polyphosphate composition optionally comprises micronutrients selected from the group consisting of Zn, Mn, Cu, B, Mo, and Se and combinations thereof. When the urea-polyphosphate composition comprises micronutrients, micronutrient content of the urea-polyphosphate composition is less than 10 wt % of the urea-polyphosphate composition. It is preferred that the micronutrient content of the urea-polyphosphate composition is less than 5 wt %. The urea-polyphosphate composition optionally comprises zinc and the zinc content is preferably less than 2 wt. %. The urea-polyphosphate composition optionally comprises manganese and the manganese content less than 2 wt. %. The water-insoluble fraction in the urea-polyphosphate composition optionally comprises copper, boron, molybdenum and selenium and the copper, boron, molybdenum and selenium content is less than 1 wt. % of the urea-polyphosphate composition.

A fertilizer comprising the urea-polyphosphate composition additionally comprises an additive selected from the group consisting of ammonium sulfate, potassium chloride, diammonium phosphate, urea-formaldehyde polymers, and combinations thereof in an amount up to 75 wt. % of the urea-polyphosphate composition. The fertilizer comprising the urea-polyphosphate composition additionally comprises ammonium sulfate and the content of ammonium sulfate is less than 40 wt. % and preferably less than 20 wt. %. The fertilizer comprising the urea-polyphosphate composition additionally comprises one or more of nitrogenous compounds, ammonium chloride, ammonium carbonate, ammonium nitrate, calcium ammonium nitrate, potassium nitrate and urea formaldehyde polymers. The fertilizer comprising the urea-polyphosphate composition additionally comprises one or more of nitrogenous compounds in an amount up to 50 wt % of total nitrogen. The fertilizer comprising the urea-polyphosphate composition additionally comprises one or more of phosphates such as diammonium phosphate, monoammonium phosphate, calcium phosphates in an amount up to 50 wt % of the fertilizer. The fertilizer comprising the urea-polyphosphate composition additionally comprises one or more of potassium compounds such as potassium chloride, potassium sulfate, potassium nitrate or potassium carbonate in an amount up to 50 wt % of the fertilizer.

The fertilizer comprising the urea-polyphosphate composition additionally comprises urease inhibitors selected from NBPT (N-[n-butyl] thiophosphorictriamide) and its derivatives and nitrification inhibitors selected from Nitrapyrin (N-serve), Dicyandiamide (DCD), neem oil and the like. The fertilizer comprising the urea-polyphosphate composition additionally comprises urease inhibitors and nitrification inhibitors in an amount less than 5 wt % of the fertilizer. The fertilizer comprising the urea-polyphosphate composition additionally comprises one or more of binders selected from the group bentonite, starch, cellulose and its derivatives, polyvinyl acetates, polyvinyl acetate copolymers, polyvinyl alcohols, alginate, lignosulfonates. When binders are included, they will constitute less than 5 wt. % of the fertilizer. Optionally, ammonium sulfate, potassium sulfate, potassium chloride, diammonium phosphate may also be used as binders.

The urea-polyphosphate composition of this invention can be characterized by X-ray diffraction reflections at the following values of 2θ and d-spacings (error range 2θ of ±0.005°): [11.165°, 7.9205 Å], [11.625°, 7.6081 Å, [12.795°, 6.9149 Å], [13.165°, 6.7214 Å], [22.355°, 3.9747 Å], [22.575°, 3.9365 Å], [22.725°, 3.9109 Å], [24.975°, 3.5634 Å], [26.735°, 3.3327 Å], [29.615°, 3.0148 Å], [29.765°, 2.9999 Å], [30.595°, 2.9204 Å], [32.005°, 2.7949 Å], [35.915°, 2.4991 Å], [37.505°, 2.3967 Å], [40.875°, 2.2066 Å], [41.935°, 2.1532 Å], [42.015°, 2.1493 Å], [44.675°, 2.0273 Å], [45.695°, 1.9844 Å], [49.905°, 1.8264 Å], [53.555°, 1.7102 Å], [55.305°, 1.6602 Å].

The fertilizer comprising the urea-polyphosphate composition comprises particles of average size greater than 1 mm. The composition will preferably consist of particles of size between 2 mm and 4 mm. In some embodiments. The average size of particles will be between 4 mm and 8 mm.

Methods of Producing Fertilizers

In an illustrative embodiment, the fertilizers are produced by heating urea optionally with added water to between 125° and 135° C., till it melts, then optionally combining it with starch. To this combination a polyphosphate in solid form is added and heating is continued till temperature of 120° and 130° C. is attained. Heating is then discontinued, and the product is ground to a powder. The powder is granulated using a suspension of ammonium sulfate by any standard method of granulation.

In another illustrative embodiment the urea-polyphosphate composition is produced by forming a molten mass comprising urea and optionally water by heating urea optionally with added water to a temperature range of 115° and 135° C., till it forms a molten mass, then optionally combining it with starch. To this reaction mixture, a polyphosphate powder is added and the reaction mixture is heated to a temperature range of 115° and 135° C. The urea-polyphosphate product is cooled. The urea-polyphosphate product solidifies on cooling and is optionally ground to a powder. The urea-polyphosphate product is optionally coarsely powdered to obtain granules of mesh size larger than 1 mm. The urea-polyphosphate product is optionally washed with water to remove soluble urea. The washed residue is dried and powdered. The urea-polyphosphate powder is granulated using a spray of water or water containing binders. Any method of granulation known to practioners of the art are used for granulation.

The addition of water to urea reduces the melting point of urea and reduces vaporization losses. The amount of water that is optionally added to urea is less than 20 wt % of urea and preferably less than 5 wt. % of urea. To state this differently, the weight ratio of urea:water varies between 100:0 to 100:20. Preferably the weight ratio is between 100:0 and 100:10. In some embodiments it is preferred that the weight ratio of urea:water is between 100:5 and 100:15. When no water is included with urea, urea starts to melt at 133° C. and significant volatilization also occurs. When urea:water is at 100:10 weight ratio, urea melts at around 120° C. Thereby, the reaction can be carried out at a lower temperature. Addition of water prior to melting urea also helps produce a urea-polyphosphate composition which has greater capacity to insolubilize urea.

Addition of starch to molten urea is optional. The amount of starch that is optionally combined with urea is less than 20 wt. % of added urea and preferably less than 10 wt. % of added urea. Differently stated, the proportion of starch to be included varies between urea:starch weight ratio of 100:0 to 100:20. Preferably, the urea:starch weight ratio varies from 100:2.5 and 100:7.5. The most preferred weight ratio of urea:starch is 100:5. It is known from scientific literature that when urea reacts with starch there is monosubstitution of hydrogen atom from a hydroxyl group of a D-glucose unit of starch by CO—$NH_2$ from urea or CO—NH—CO—$NH_2$ group from biuret produced from urea (Siemion et al., Journal of Polymers and the Environment, 12, 247-255 (2004). The applicant believes that starch could also bind to the polyphosphate through its hydroxyl groups by elimination of a water molecule between the OH-starch (hydroxyl group on starch) and OH—PP (hydroxyl group on polyphosphate); thereby, the starch would form a cross-linkage between the polyphosphate structure and the urea, and bind it more firmly, so that is insolubilized by water.

Following the addition of starch, polyphosphate powder is added to the reaction mixture. The amount of polyphosphate added can vary between urea:polyphosphate weight ratios of 100:10 and 100:40. Preferably, the weight ratio of urea: polyphosphate is between 100:15 and 100:30. More preferably the ratio is between 100:18 and 100:25.

Following the addition of polyphosphate, there is a temperature drop when the polyphosphate is added. Heating is continued till the liquid temperature is between 115° and 135° C. Heating is done till the reaction mixture starts to bubble; bubbling indicates the reaction between polyphosphate OH— groups and urea $NH_2$-groups with elimination of a water molecule. It additionally indicates the elimination of water trapped within the polyphosphate due to replacement by urea.

Without wishing to be bound by the theory, applicant believes that when urea in a molten state is combined with polyphosphate, it can penetrate the polyphosphate structure and displace the water molecules. Presence of water when urea is being heated to melt it, reduces volatilization losses. Presence of starch improves hardness and cohesiveness of the final product and reduces water solubility. When polyphosphate and urea are heated, bubbling occurs, that indicates loss of water. Water loss after addition of polyphosphate indicates that structural water from polyphosphate is removed and urea is being combined within the polyphosphate crystal. Heating is discontinued when temperature attains around 125° C. after which temperature ammonia volatilization increases significantly. At this stage, the product is in a liquid state. On discontinuing heating, the product solidifies when cooled to room temperature. This reaction product is optionally ground to 0.3 mm. In other embodiments it is lightly ground to granules between 1 mm and 4 mm size. The powder and smaller granules are optionally granulated or recycled into the subsequent batch of urea-polyphosphate when it is in a liquid state.

In another preferred embodiment, the product obtained after the reaction of urea and polyphosphate, is extracted with water to remove the soluble urea fraction. The product is ground to a powder of 0.3 mm or less and extracted with water in a centrifuge or by filtration using vacuum or pressure. The amount of water required for washing out the soluble urea fraction depends on the method of separation employed. Generally, less than 1.5 times the weight of urea-polyphosphate complex is required to remove most of the soluble urea. The washings are recovered dried to evaporate the water and then reused in the process. The washed residue is dried at 50° C. and optionally powdered.

The urea-polyphosphate reaction product in the powdered form is subsequently granulated. Granulation is performed using a spray of water that optionally contains binders. Granulation methods include rotating drum granulators, pan granulators and the like known to practitioners of the art. Preferred binders are ammonium sulfate and potassium chloride. Binders improve cohesiveness and reduce water solubility of urea. Ammonium sulfate is most preferred to other binders since it adds nitrogen to the final product.

A preferred polyphosphate is calcium polyphosphate. Calcium polyphosphate has lower water solubility than magnesium polyphosphate and can reduce the solubility of trapped urea. Magnesium polyphosphate has more water solubility but also has greater amounts of structural water; it may be preferred in its ability to trap more urea but less preferred because urea is more soluble. In other embodiments an iron magnesium polyphosphate is used to complex with urea. All of these polyphosphates are effective in their ability to insolubilize urea. However, calcium polyphosphate is preferred since it is most economical.

A small amount of iron in the calcium polyphosphate improves structural stability and reduces water solubility of urea. The polyphosphate may also include small amounts of other micronutrients such as zinc, manganese, copper, boron and molybdenum. These will enrich the product with additional nutrients and add more value. Generally added micronutrients will be less than 15 wt % of the polyphosphate composition and preferably less than 10 wt. %.

Calcium polyphosphate is preferably produced by preheating phosphoric acid to around 120° to 130° C., adding a magnetite slurry, subsequently adding quick lime (CaO) and continuing the heating till liquid temperature attains 145° to 155° C. The mixture of phosphoric acid and calcium oxide is preferably heated till a sample neutralized with calcium carbonate is insoluble in water and soluble in 0.2 wt. % citric acid. At this stage heating is discontinued and the polyphosphate liquid is finally neutralized with a slurry of calcium carbonate. The neutralized product is dried at 70° to 100° C. and ground to a powder of around 0.1 mm.

Magnesium polyphosphate is preferably produced by preheating phosphoric acid to around 130° to 150° C., adding a magnetite slurry, subsequently adding magnesite powder and continuing the heating till liquid temperature attains 145° to 158° C., then discontinuing heating and finally neutralizing with a slurry of magnesite. The neutralized product is dried at 70° to 100° C. and ground to a powder. of around 0.1 mm.

Iron polyphosphate is preferably produced by adding magnetite to phosphoric acid while stirring. The exothermic reaction raises liquid temperature to around 90° C. The suspension is neutralized with magnesite suspension. The neutralized product is dried at 60° to 100° C. and ground to a powder of around 0.1 mm.

In the production of polyphosphate, preheating of phosphoric acid is desirable because it reduces amounts of orthophosphates that will be produced. It also saves energy because the heat of reaction when CaO is introduced to hot acid raises the temperature and thus saves on heating. Addition of small amounts of iron as magnetite produces a polyphosphate with lower water solubility and better structural stability to trap urea. The production of iron polyphosphate is an exception in that it does not require preheating of phosphoric acid. The polyphosphate produced has water solubility of less than 1 wt % phosphorus and solubility in 0.2% citric acid greater than 90 wt. %.

The polyphosphate optionally also includes one or more nutrients selected from Zn, Fe, Mn, Cu, B, Mo, Se. Oxides and salts of these compounds are added to preheated phosphoric acid at temperatures up to 150° C. The polyphosphate is neutralized with oxides, hydroxides or carbonates of one or more of calcium, magnesium, ammonium or potassium.

A fertilizer comprising the urea-polyphosphate composition can additionally contain other fertilizers and agricultural chemicals including urea formaldehyde polymers such as methylene urea, dimethylenetriurea, triazones, crotonylidenediurea, isobutylidenediurea; fertilizers of potassium, sulfur, zinc, iron, manganese, copper, boron, molybdenum, one or more urease inhibitors and nitrification inhibitors selected from NBPT, DCD, DMPP, nitrapyrin, and neem oil.

The use of binders during granulation is optional. Binders include any one or more of inorganic compounds selected from ammonium sulfate, potassium sulfate, potassium nitrate, urea, diammonium phosphate, monoammonium phosphate. Binders to aid granulation are also optionally selected from organic materials including but not restricted to alginates, cellulose derivatives, acrylates, gums, polyacrylates.

The fertilizer comprising the urea-polyphosphate composition is optionally further treated with coating materials that include formaldehyde, polyurethanes, polyacrylates, polyolefins, sulfur, attapulgite, silicate clays, zeolites, oxides. The fertilizer granules are coated by methods known to practioners of the art and include spraying solutions followed by drying, copolymerization at the granule surface and electrostatic absorption.

Utilizations of Fertilizers

The fertilizer comprising the urea-polyphosphate composition may be added to soil containing at least one or more plant to be fertilized. Without wishing to be bound by the theory, soluble urea will initially provide the necessary nutrient for the growing plant. The root systems of the plants will release acids to absorb nutrients from the soil. Accordingly, as the root system of the plants require nutrients they release acids which will dissolve the polyphosphate framework of the granular fertilizer product and release the urea which will provide the necessary nitrogen to the plant system.

The fertilizers comprising the urea-polyphosphate composition may be mixed with various agricultural inputs before being added to the soil. Suitable additives include other fertilizers, pesticides, agrichemicals. Non-limiting examples of other fertilizers include urea, diammonium phosphate, monoammonium phosphate and muriate of potash. Non-limiting examples of other pesticides include malathion, parathion, 2-4D, and s-triazines. Non-limiting examples of other additives and agrichemicals include manure, gypsum, growth promoters, humic acids.

Another optional use of the fertilizers the comprising the urea-polyphosphate composition disclosed herein is as an animal feed supplement. The fertilizer may be mixed with animal feeds such as grain.

The present disclosure further includes the following enumerated embodiments.

Embodiment 1. A urea-polyphosphate composition comprising urea, a polyphosphate, inorganic cations, and a water-insoluble fraction having (a) a nitrogen content in the range of 5 wt % to 40 wt %, (b) a phosphorus content in the range of 1 wt % to 20 wt. %, (c) primary inorganic cations in the range of 1 wt % to 20 wt % wherein the primary inorganic cations are selected from the group consisting of ammonium, calcium, iron, magnesium, and potassium cations and combinations thereof, (d) a molar ratio of nitrogen to the combined total of the primary inorganic cations in the range of 2:1 to 40:1, (e) a number average chain length of polyphosphate groups of 1.1 to 20 when orthophosphates are included in the number average chain length calculation, (f) a molar ratio of nitrogen to phosphorous in the range of 3:1 to 60:1, and (g) a solubility in citric acid such that (i) at least 70 wt. % of each of the total nitrogen and total phosphorous in the water-insoluble fraction is soluble in 2 wt. % citric acid, and (ii) at least 50 wt. % of each of the total nitrogen and the total phosphorous in the water-insoluble fraction is soluble in 0.2 wt. % citric acid.

Embodiment 2. The urea-polyphosphate composition of Embodiment 1 wherein the water-insoluble fraction is obtained by placing 2 g of the urea-polyphosphate composition on a filter paper in a funnel over a Whatman 1 filter paper, leaching with 10 mL deionized water added dropwise from a burette for 8 minutes at 25° C. and collecting the solid residue.

Embodiment 3. The urea-polyphosphate composition of any previous embodiment wherein the nitrogen content in the water-insoluble fraction is in the range of 5-30 wt %.

Embodiment 4. The urea-polyphosphate composition of any previous embodiment wherein the nitrogen content in the water-insoluble fraction is in the range of 20-40 wt %.

Embodiment 5. The urea-polyphosphate composition of any previous embodiment wherein the phosphorus content in the water-insoluble fraction is in the range of 4 wt % to 13 wt. %.

Embodiment 6. The urea-polyphosphate composition of any previous embodiment wherein the phosphorus content in the water-insoluble fraction is in the range of 9-13 wt %.

Embodiment 7. The urea-polyphosphate composition of any previous embodiment wherein the inorganic cation content in the water-insoluble fraction is in the range of 5 wt % to 15 wt %.

Embodiment 8. The urea-polyphosphate composition of any previous embodiment wherein the inorganic cation content in the water-insoluble fraction is in the range of 5 wt % to 10 wt %.

Embodiment 9. The urea-polyphosphate composition of any previous embodiment wherein the inorganic cations are selected from the group consisting of calcium, magnesium and iron.

Embodiment 10. The urea-polyphosphate composition of any previous embodiment wherein the inorganic cations include calcium.

Embodiment 11. The urea-polyphosphate composition of any previous embodiment wherein the molar ratio of nitrogen to the combined total of the primary inorganic cations in the water-insoluble fraction is in the range of 3:1 to 15:1.

Embodiment 12. The urea-polyphosphate composition of any previous embodiment wherein the molar ratio of nitrogen to the combined total of the primary inorganic cations in the water-insoluble fraction is in the range of 6:1 to 15:1.

Embodiment 12A. The urea-polyphosphate composition of any previous embodiment wherein the number average chain length of polyphosphate groups in the water-insoluble fraction is 1.1 to 5 when orthophosphates are included in the number average chain length calculation.

Embodiment 13. The urea-polyphosphate composition of any previous embodiment wherein the number average chain length of polyphosphate groups in the water-insoluble fraction is 1.1 to 3 when orthophosphates are included in the number average chain length calculation.

Embodiment 14. The urea-polyphosphate composition of any previous embodiment wherein the molar ratio of nitrogen to phosphorous in the water-insoluble fraction is in the range of 2:1 to 15:1.

Embodiment 14A. The urea-polyphosphate composition of any previous embodiment wherein the molar ratio of nitrogen to phosphorous in the water-insoluble fraction is in the range of 4:1 to 8:1.

Embodiment 15. The urea-polyphosphate composition of any previous embodiment wherein the molar ratio of nitrogen to phosphorous in the water-insoluble fraction is in the range of 4:1 to 14:1.

Embodiment 16. The urea-polyphosphate composition of any previous embodiment wherein the molar ratio of nitrogen to phosphorous in the water-insoluble fraction is in the range of 2:1 to 6:1.

Embodiment 17. The urea-polyphosphate composition of any previous embodiment wherein the molar ratio of nitrogen to phosphorous in the water-insoluble fraction is in the range of 8:1 to 10:1.

Embodiment 18. The urea-polyphosphate composition of any previous embodiment wherein the water-insoluble fraction has a solubility in citric acid such that (i) at least 90 wt. % of each of the total nitrogen and total phosphorous in the water-insoluble fraction is soluble in 2 wt. % citric acid.

Embodiment 19. The urea-polyphosphate composition of any previous embodiment wherein the water-insoluble fraction has a solubility in citric acid such that (i) at least 98 wt. % of each of the total nitrogen and total phosphorous in the water-insoluble fraction is soluble in 2 wt. % citric acid.

Embodiment 20. The urea-polyphosphate composition of any previous embodiment wherein the water-insoluble fraction has a solubility in citric acid such that (i) at least 70 wt. % of each of the total nitrogen and total phosphorous in the water-insoluble fraction is soluble in 0.2 wt. % citric acid.

Embodiment 21. The urea-polyphosphate composition of any previous embodiment wherein the water-insoluble fraction has a solubility in citric acid such that (i) at least 80 wt. % of each of the total nitrogen and total phosphorous in the water-insoluble fraction is soluble in 0.2 wt. % citric acid.

Embodiment 22. The urea-polyphosphate composition of any previous embodiment wherein the urea-polyphosphate composition additionally comprises a cross-linking promoter containing hydroxyl groups.

Embodiment 23. The urea-polyphosphate composition of any previous embodiment wherein the urea-polyphosphate composition additionally comprises a cross-linking promoter containing hydroxyl groups selected from the group consisting of polysaccharides, cellulose derivatives, polyalcohols, natural gums, and combinations thereof.

Embodiment 24. The urea-polyphosphate composition of any previous embodiment wherein the urea-polyphosphate composition additionally comprises starch.

Embodiment 25. The urea-polyphosphate composition of any previous embodiment wherein the urea-polyphosphate composition additionally comprises starch and the starch content is less than 20 wt. % of the urea-polyphosphate composition.

Embodiment 26. The urea-polyphosphate composition of any previous embodiment wherein the water-insoluble fraction in the urea-polyphosphate composition additionally comprises micronutrients selected from the group consisting of Zn, Fe, Mn, Cu, B, Mo, and Se and combinations thereof.

Embodiment 27. The urea-polyphosphate composition of any previous embodiment wherein the water-insoluble fraction in the urea-polyphosphate composition additionally comprises micronutrients selected from the group consisting of Zn, Fe, Mn, Cu, B, Mo, and Se and combinations thereof, and the water-insoluble micronutrient content of the urea-polyphosphate composition is less than 10 wt %.

Embodiment 28. The urea-polyphosphate composition of any previous embodiment wherein the urea-polyphosphate composition additionally comprises a water-soluble fraction comprising urea.

Embodiment 29. The urea-polyphosphate composition of any previous embodiment wherein the urea-polyphosphate composition additionally comprises a water-soluble fraction comprising urea and the water-soluble urea content of the urea-polyphosphate composition is between 5 wt. % and 95% wt % of the total urea.

Embodiment 30. The urea-polyphosphate composition of any previous embodiment wherein the urea-polyphosphate composition additionally comprises a water-soluble fraction comprising urea and the water-soluble urea content of the urea-polyphosphate is between 30 wt. % and 80% wt. % of the total urea.

Embodiment 31. The urea-polyphosphate composition of any previous embodiment wherein the urea-polyphosphate composition additionally comprises a water-soluble fraction comprising urea and the water-soluble urea content of the urea-polyphosphate is between 20 wt. % and 60 wt. % of the total urea.

Embodiment 32. The urea-polyphosphate composition of any previous embodiment wherein the urea-polyphosphate composition additionally comprises a water-soluble fraction comprising urea and the water-soluble urea content of the urea-polyphosphate is between 60 wt. % and 80%. wt % of the total urea.

Embodiment 33. The urea-polyphosphate composition of any previous embodiment wherein the urea-polyphosphate composition is in granular form and the granules have a screen size of at least 1 mm.

Embodiment 34. The urea-polyphosphate composition of any previous embodiment wherein the urea-polyphosphate composition is in granular form and the granule screen size is in the range of 2-4 mm.

Embodiment 35. The urea-polyphosphate composition of any previous embodiment wherein the inorganic fraction has an XRD pattern with peaks at the following values of 2θ and d-spacings (error range of 2θ±0.005°): [11.165°, 7.9205 Å], [11.625°, 7.6081 Å, [12.795°, 6.9149 Å], [13.165°, 6.7214 Å], [22.355°, 3.9747 Å], [22.573°, 3.9365 Å], [22.725°, 3.9109 Å], [24.975°, 3.5634 Å], [26.735°, 3.3327 Å], [29.615°, 3.0148 Å], [29.765°, 2.9999 Å], [30.595°, 2.9204 Å], [32.005°, 2.7949 Å], [35.915°, 2.4991 Å], [37.505°, 2.3967 Å], [40.875°, 2.2066 Å], [41.935°, 2.1532 Å], [42.015°, 2.1493 Å], [44.675°, 2.0273 Å], [45.695°, 1.9844 Å], [49.905°, 1.8264 Å], [53.555°, 1.7102 Å], [55.305°, 1.6602 Å].

Embodiment 36. The urea-polyphosphate composition of any previous embodiment wherein the inorganic fraction has an XRD pattern with peaks at the following values of d-spacings: 25.39 (broad band), 3.97 (±0.02), 3.94 (±0.02), 3.91 (±0.02), 3.55 (±0.01), 3.3 (±0.01), 3.01 (±0.01), 3.0 (±0.009), 2.92 (±0.009), 2.79 (±0.008), 2.49 (±0.007), 2.4 (±0.007), 2.21 (±0.005), 2.15 (±0.005), 2.03 (±0.005), 1.98 (±0.004), 1.83 (±0.004), 1.71 (±0.003), 1.66 (±0.0027) A.

Embodiment 37. The urea-polyphosphate composition of any previous embodiment wherein the inorganic fraction has an XRD pattern with peaks at the following values of d-spacings: 3.55 Å (±0.01), 3.0 Å (±0.009), 2.79 Å (±0.008), 2.49 Å (±0.007), 2.4 Å (±0.007), 2.21 Å (±0.005), 2.15 Å (±0.005), 1.83 Å (±0.004), 1.66 Å (±0.0027) Å.

Embodiment 38. A fertilizer comprising the urea-polyphosphate composition of any previous embodiment.

Embodiment 39. A fertilizer comprising the urea-polyphosphate composition of any previous embodiment wherein the fertilizer additionally comprises an additive selected from the group consisting of ammonium sulfate, potassium chloride, diammonium phosphate, urea-formaldehyde polymers, and combinations thereof.

Embodiment 40. A fertilizer comprising the urea-polyphosphate composition of any previous embodiment wherein the fertilizer additionally comprises an additive selected from the group consisting of ammonium sulfate, potassium chloride, diammonium phosphate, urea-formaldehyde polymers, and combinations thereof in an amount up to 75 wt. % of the urea-polyphosphate composition.

Embodiment 41. A fertilizer comprising the urea-polyphosphate composition of any previous embodiment wherein the fertilizer additionally comprises ammonium sulfate.

Embodiment 42. A fertilizer comprising the urea-polyphosphate composition of any previous embodiment wherein the fertilizer additionally comprises a micronutrient selected from the group consisting of Zn, Fe, Mn, Cu, B, Mo, and Se and combinations thereof.

Embodiment 43. A fertilizer comprising the urea-polyphosphate composition of any previous embodiment wherein the fertilizer additionally comprises a micronutrient selected from the group consisting of Zn, Fe, Mn, Cu, B, Mo, S and Se and combinations thereof wherein the amount of micronutrient is less than 10 wt % of the fertilizer.

Embodiment 43A. A fertilizer comprising the urea-polyphosphate composition of any previous embodiment wherein the fertilizer additionally comprises sulfur.

Embodiment 43B. A fertilizer comprising the urea-polyphosphate composition of any previous embodiment wherein the fertilizer additionally comprises sulfur wherein the amount of sulfur is less than 5 wt. % of the fertilizer.

Embodiment 44. A fertilizer comprising the urea-polyphosphate composition of any previous embodiment wherein the fertilizer additionally comprises coating materials that include formaldehyde, polyurethanes, polyacrylates, polyolefins, sulfur, attapulgite, silicate clays, zeolites, oxides.

Embodiment 46. A fertilizer comprising the urea-polyphosphate composition of any previous embodiment wherein the fertilizer additionally comprises a urease inhibitor.

Embodiment 47. A fertilizer comprising the urea-polyphosphate composition of any previous embodiment wherein the fertilizer additionally comprises a urease inhibitor selected from the group consisting of N-[n-butyl] thiophosphorictriamide or a derivative thereof.

Embodiment 48. A fertilizer comprising the urea-polyphosphate composition of any previous embodiment wherein the fertilizer additionally comprises a nitrification inhibitor.

Embodiment 49. A fertilizer comprising the urea-polyphosphate composition of any previous embodiment wherein the fertilizer additionally comprises a nitrification inhibitor selected from the group consisting of nitrapyrin, dicyandiamide (DCD), or neem oil.

Embodiment 50. A fertilizer comprising the urea-polyphosphate composition of any previous embodiment wherein the fertilizer additionally comprises a growth promoter.

Embodiment 51. A fertilizer comprising the urea-polyphosphate composition of any previous embodiment wherein the fertilizer additionally comprises a growth promoter selected from the group consisting of auxin, gibberellin (GA), cytokinin, ethylene, and abscisic acid, aminoacids, and seaweed extracts, and combinations thereof.

Embodiment 52. A fertilizer comprising the urea-polyphosphate composition of any previous embodiment wherein the fertilizer additionally comprises a natural or synthetic pesticide.

Embodiment 53. A fertilizer comprising the urea-polyphosphate composition of any previous embodiment wherein the fertilizer additionally comprises a pesticide selected from the group consisting of neem oil, garlic extract, onion extract and combinations thereof.

Embodiment 54. A fertilizer comprising the urea-polyphosphate composition of any previous embodiment wherein the fertilizer additionally comprises a pesticide selected from the group consisting of an organophosphate, organochlorine, triazine, triazole, a pyrethroid or a combination thereof.

Embodiment 55. A fertilizer comprising the urea-polyphosphate composition of any previous embodiment wherein the fertilizer additionally comprises a binder.

Embodiment 56. A fertilizer comprising the urea-polyphosphate composition of any previous embodiment wherein the fertilizer additionally comprises a binder selected from the group consisting of bentonite, starch, cellulose and its derivatives, polyvinyl acetates, polyvinyl acetate copolymers, polyvinyl alcohols, alginate, lignosulfonates, and combinations thereof.

Embodiment 57. A process for the preparation of a urea-polyphosphate composition or a fertilizer of any previous embodiment, the process comprising forming a polyphosphate powder and reacting the polyphosphate powder with urea, wherein (1) forming the polyphosphate powder comprises (a) combining phosphoric acid, optionally preheated up to 150° C., with at least one of the metals calcium, magnesium, iron, potassium and ammonium and optionally one or more elements from zinc, manganese, copper, boron, molybdenum and selenium to form a reaction mixture, (b) heating the reaction mixture to a temperature in the range of 70° C. to 160° C. to produce a polyphosphate intermediate, (c) adding water to the reaction mixture to quench the polymerization reaction, (e) neutralizing the polyphosphate intermediate with a neutralizing base to form a polyphosphate product, (f) drying and grinding the polyphosphate product to form a polyphosphate powder, and (2) reacting the polyphosphate powder with urea comprises (g) forming a molten mass comprising urea and optionally water, (h) optionally adding starch to the molten mass, (i) combining the polyphosphate powder and the molten mass to form a urea-polyphosphate reaction mixture, (j) heating the urea-polyphosphate reaction mixture to a temperature in the range of 1150 to 135° C. to form a urea-polyphosphate product, (k) cooling the urea-polyphosphate product, and (l) grinding the cooled urea-polyphosphate product to form the urea-polyphosphate composition.

Embodiment 58. The process of embodiment 57 wherein the process additionally comprises extracting the urea-polyphosphate composition with water to remove soluble urea from the urea-polyphosphate composition, drying the extracted urea-polyphosphate composition, and powdering the dried urea-polyphosphate composition.

Embodiment 59. The process of embodiment 57 or 58 wherein the urea-polyphosphate composition is granulated.

Embodiment 60. The process of embodiment 59 wherein the urea-polyphosphate composition is granulated by spraying the urea-polyphosphate composition with water optionally containing a binding agent and granulating the sprayed urea-polyphosphate composition in a granulator.

Embodiment 61. A process for fertilizing plants or soil, the process comprising applying a urea-polyphosphate composition or fertilizer of any previous embodiment to the soil.

EXAMPLES

In the examples, the following methods were used to study the fertilizers:

Analysis of total nitrogen: In the absence of nitrates or ammonium the process described in AOAC method 978.02 (Johnson FJ (1990) Fertilizers. In: Helrich K (ed) AOAC Official Methods of Analysis. vol 1, 9-39) involving digestion in sulfuric acid followed by distillation is used. This nitrogen is wholly from urea. When nitrates or ammonium is present these are determined separately (AOAC 930.02 and 920.03, Johnson FJ (1990) Fertilizers. In: Helrich K (ed) AOAC Official Methods of Analysis. vol 1, 9-39).

Determination of water-insoluble nitrogen: 2 g of the product in powder form, is weighed into a filter paper (Whatman 1) placed in a funnel. It is leached with 10 mL water added dropwise from a burette within a period of 8 min. The wet residue is placed together with the filter paper, in a petridish and dried at 50° C. After drying, the residue is ground and used for analysis of nitrogen.

Determination of water-soluble nitrogen: 2 g of the product in powder form, is weighed into a filter paper (Whatman 1) placed in a funnel. It is leached with 10 mL water added dropwise from a burette within a period of 8 min. The filtrate is placed together with the filter paper, in a petridish and dried at 50° C. After drying, the dried mass is weighed. It is analyzed for N as described above. When soluble compounds other than urea are absent in the product, the weight of the dried residue gives the total water-soluble nitrogen.

Determination of total phosphorus of water-insoluble portion: To 2 g of the solid sample weighed into a filter paper in a funnel, 10 mL water is added dropwise from a burette within a period of 8 min. The wet residue is placed together with the filter paper, in a dish and dried at 50° C. After drying, the residue is ground and 50 mg is weighed into an Erlenmeyer flask. To this, 10 mL concentrated HCl is added and the solution is heated till fuming for 10 min. The solution is filtered and made to volume. Phosphate is determined as molybdovanadophosphate (AOAC method 958.01).

Determination of citric acid soluble nitrogen and phosphorus: To 2 g of the solid sample weighed into a filter paper in a funnel, 10 mL water is added dropwise from a burette within a period of 8 min. The wet residue is placed together with the filter paper, in a dish and dried at 50° C. After drying, the residue is ground. 50 mg of this dried sample is weighed into a filter paper (Whatman 1) placed in a funnel. It is leached with 50 mL of 2 wt % citric acid or 0.2 wt % citric acid added dropwise from a burette within a period of 20 min. The filtrate is collected in a dish and dried at 50° C. After drying, the residue is ground and weighed. The residue is then analyzed for nitrogen and phosphorus as described above.

Determination of polyphosphate chain length of water insoluble portion: To 2 g of the solid sample weighed into a filter paper in a funnel, 10 mL water is added dropwise from a burette within a period of 8 min. The wet residue is placed together with the filter paper, in a petridish and dried at 50° C. After drying, the residue is ground. 50 mg of the powdered sample is dissolved in 0.1 N HCl, immediately transferred to a flask containing cation exchange resin in H-form (Amberlite-IR-120 cation exchange resin converted to H-form), mixed for 5 min, decanted into a volumetric flask and made to volume. This removes calcium and other cations that would interfere with the chain length analysis. The solution is immediately analyzed for chain length by the titrimetric method (Ray et al, J. Agric. Food Chem. 1998, 46, 2222-2226).

X-ray Diffraction (XRD): XRD of powder samples is recorded using CuKα radiation at 1° 2θ/min with a scan range of 2° to 60°, error range of 2θ±0.005°.

Thermal analysis: Thermogravimetry (DTG) and differential scanning calorimetry (DSC) are done with powder samples in alumina pan from 40° to 700° C. at a heating rate of 20° C./min.

Field trials: This was a randomized block design (RBD) conducted in farmer's field with 4 replicates per treatment and plots of 3 m×3 m for each treatment. Treatments consisted of a control and different levels of the fertilizer composition containing urea-calcium polyphosphate composition. The control had urea mixed with calcium polyphosphate (whereby the urea gets coated with calcium polyphosphate, similar to that in Example 24); the amount of calcium polyphosphate in all treatments was the same as that in the urea-calcium polyphosphate complex at the highest dose. Thus, the comparisons were for the complex versus the coating of urea with calcium polyphosphate.

Example 1: Urea Reacted with Calcium Polyphosphate, Granulated with Ammonium Sulfate(Urea:CaPP:Starch:Water=100:18:5:2.5)

The fertilizer of this example was produced using calcium polyphosphate as the caging agent. First, the calcium polyphosphate was produced. Technical grade phosphoric (60% $P_2O_5$) 1 liter volume was heated in an oil bath to 125°. Magnetite (69% Fe) slurry was prepared by mixing 20 g magnetite in 20 milliters water. The magnetite slurry was added to the heated phosphoric acid with continuous stirring of the mixture. Subsequently, 165 g quick lime (CaO, 69% Ca) was added to the reaction mixture. Reaction was exothermic and temperature rose to 152° C. Heating and stirring were continued till temperature reached 155° C. Heating was discontinued and 1 liter water was added to the reaction mixture. Subsequently a slurry of 1244 g calcite ($CaCO_3$, 39% Ca) in 2 liter water was added to the reaction mixture with continuous stirring. The neutralized product was dried at 80° C. and ground to a powder (size<100 mesh). The product contained 48 wt. % $P_2O_5$, 18.6 wt. % Ca and 0.6 wt. % Fe. It had a pH of 5.6; water soluble $P_2O_5$ was 1.2% and 0.2% citric acid soluble $P_2O_5$ was 99%. Number average chain length of this polyphosphate was 2.9 excluding orthophosphate and 1.4 when orthophosphate was included; Orthophosphate content was 57%. XRD of this polyphosphate is reproduced in FIG. 1*b*. XRD of the urea used here is also reproduced in FIG. 1*c*.

2 kg urea (46% N) was mixed with 50 mL water in a glass beaker and placed in an oil bath. It was heat with constant stirring, till the temperature reached 130° C.; at this temperature urea melted and a clear solution was obtained. 100 g starch was added to this clear liquid and stirred. Subsequently, 360 g calcium polyphosphate powder was added and heating was continued till a temperature of 125° C. was attained. At this stage the liquid bubbled due to evolution of water as steam and faint smell of ammonia was also observed. The beaker was removed from the oil bath and the liquid was poured into trays to cool. On cooling to room temperature, a solid was obtained. The solid was ground in a grinder. It was granulated in a pan granulator using a solution of 140 g ammonium sulfate in 250 mL water. The granules were dried at 55° C.

This fertilizer had a composition, 36 wt. % N (78 wt % urea), 6.6 wt. % $P_2O_5$, 2.6 wt. % Ca. The N:P molar ratio of this product was 27.5:1. The N:Ca molar ratio was 39.6:1. When 5 g of this fertilizer, placed on a filter paper in a funnel was leached with 20 mL water in a period of 10 min, 44 wt. % of total N from fertilizer was soluble in water. When 2 g of this fertilizer, placed on a filter paper in a funnel was leached with 10 mL water in a period of 8 min, the residue contained 50.9 wt % urea. The composition of the leached residue is 50.9% urea (23.4% N), 19.5% $P_2O_5$, 9.1% Ca; the N:P molar ratio is 6.1:1 and the N:Ca molar ratio is 7.3:1. When the same process was repeated for urea, it showed 100 wt % of total nitrogen was soluble and no urea was detectable in the residue. Solubility in 2 wt. % citric acid was 95%. When the leached residue was analysed for chain length of polyphosphate the number average chain length of this polyphosphate was 2.9 excluding orthophosphate and 1.4 when orthophosphate was included; its orthophosphate content was 57%. The filtrate when analyzed for phosphorus showed 95 wt. % P was solubilized. When 50 mg of the fertilizer sample was leached with 50 mL 0.2 wt. % citric acid added dropwise in a period of 20 min, the residue showed no detectable amount of urea. The filtrate when analyzed for phosphorus showed 82 wt. % P was solubilized. The nitrogen fertilizer product showed XRD peaks at 25.36, 4.31, 4.25, 3.93, 3.91, 3.9, 3.56, 3.55, 3.33, 3.31, 3.0, 2.92, 2.79, 2.5, 2.4, 2.39, 2.33, 2.21, 2.15, 2.03, 1.98, 1.83, 1.66 Angstrom (FIG. 1*a*). XRD was of the granulated product which was powdered for recording of XRD.

Figure 3:
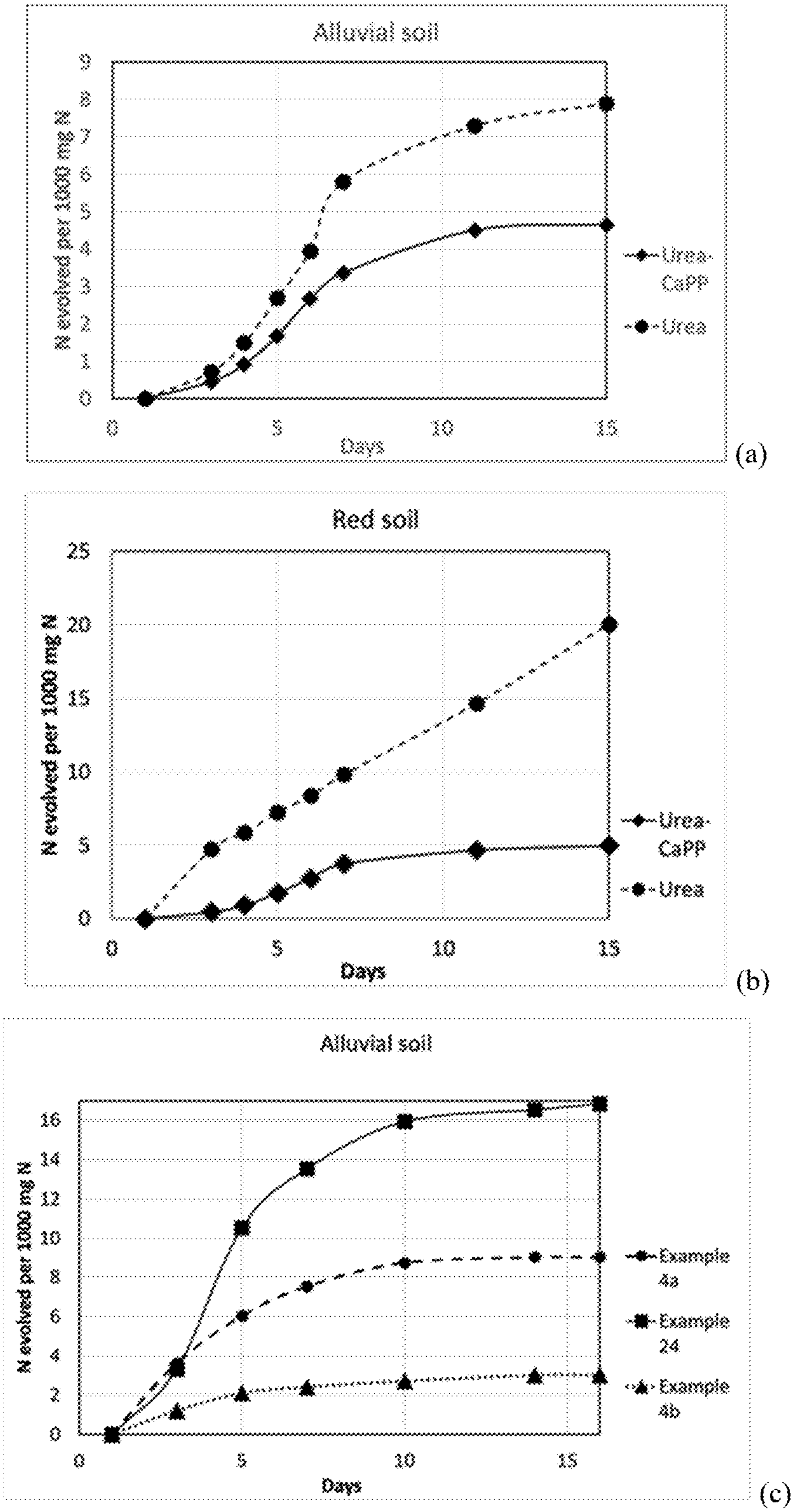
FIG. 3: Ammonia evolution comparisons (a) and (b) between example 1 and Urea and (c) between example 4a and example 24

Nitrogen volatilization losses were studied by incubating in four different soils. Ammonia volatilized was determined. Nitrogen volatilized as ammonia expressed as a percentage of urea volatilized was 59% for an alluvial soil and 25% for an acidic red soil. Therefore, volatilization losses are significantly reduced with respect to urea (FIG. 3).

Figure 2:
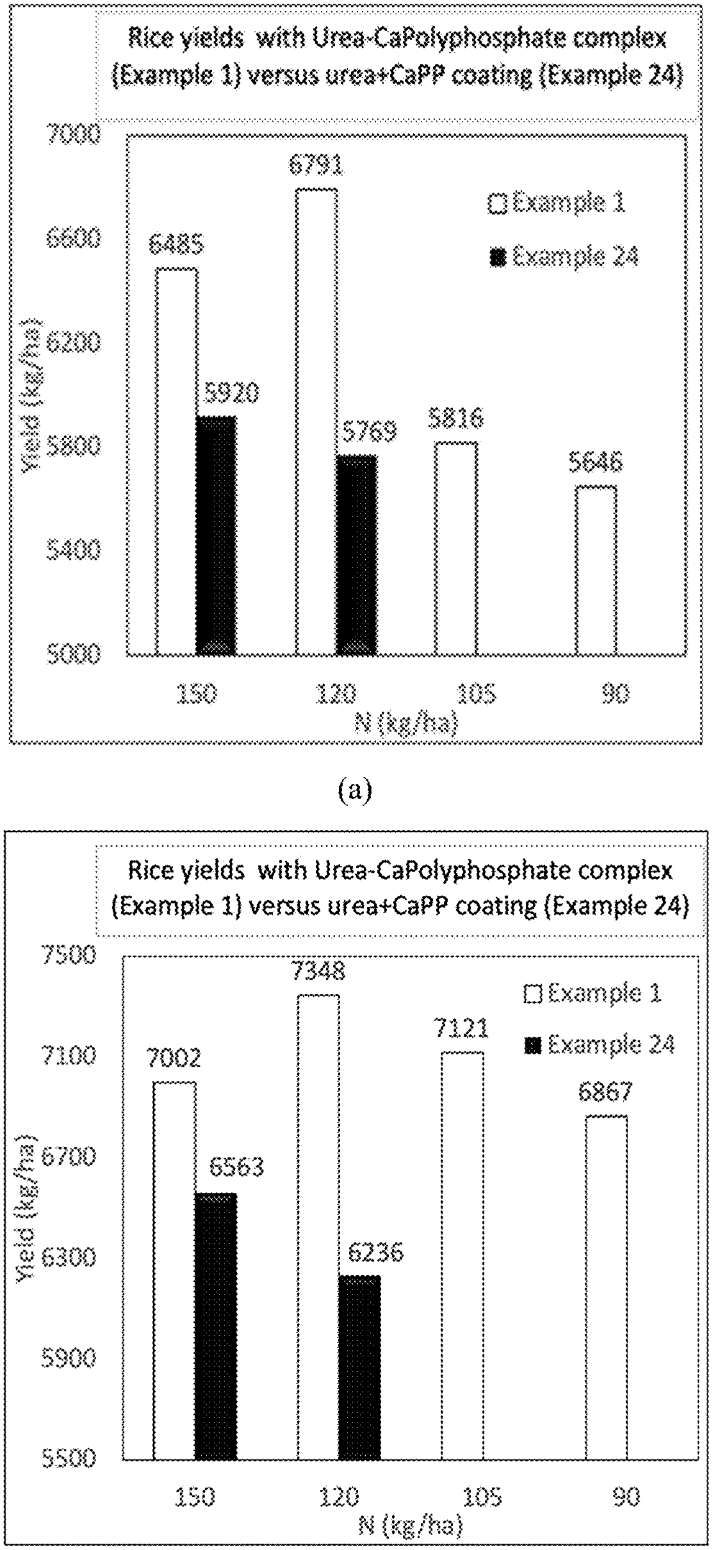
FIG. 2: Field trials with urea-calcium polyphosphate complex (Example 4a). Comparison treatments are with urea that is coated with calcium polyphosphate (Example 24)
Figure 2:
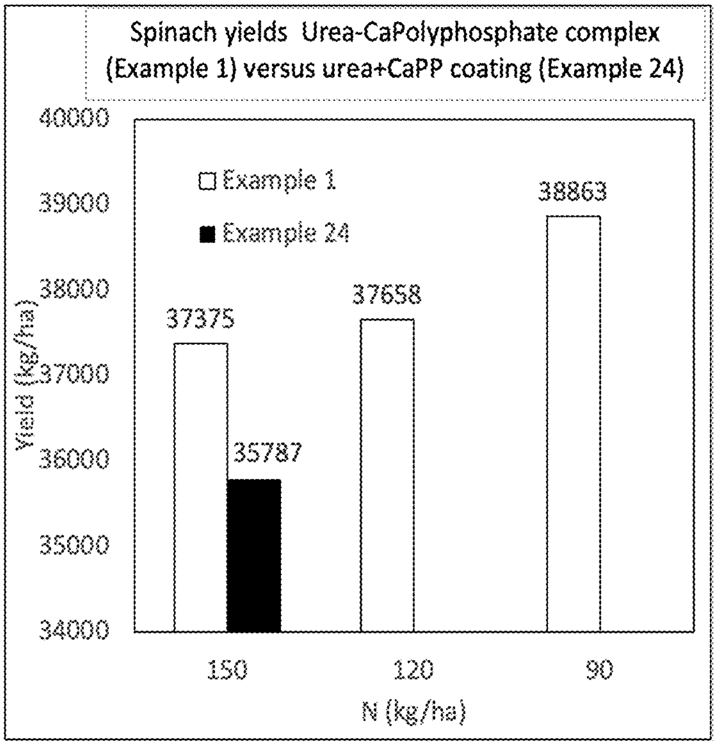
Figure 2:
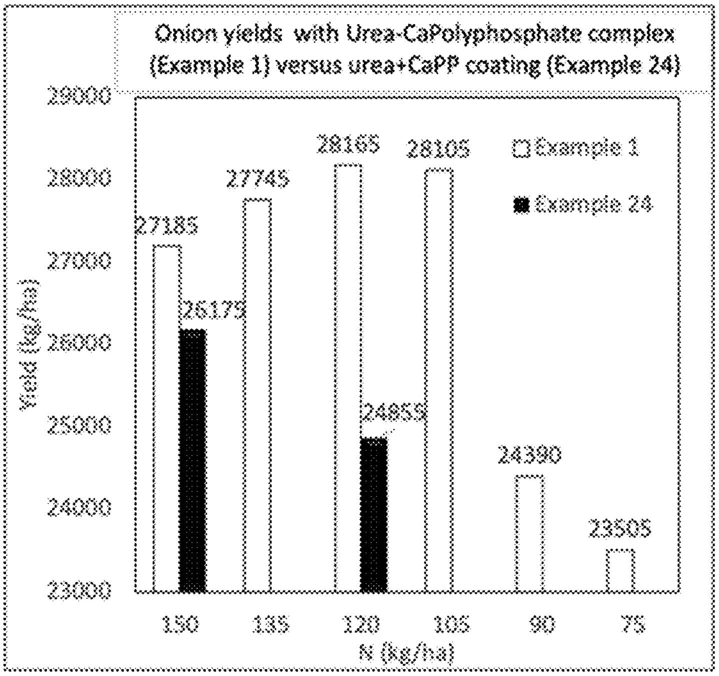
Figure 2:
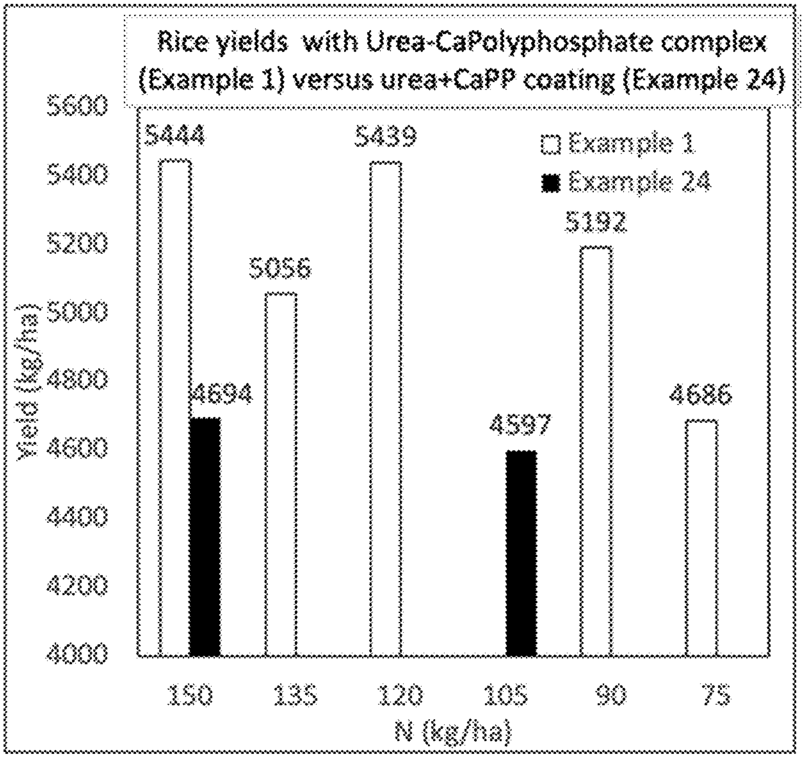

Field trials with this product were conducted using three different crops in different agroclimatic locations. Results are reproduced in Table 1. In these trials, the urea-calcium polyphosphate complex was compared with urea; in the urea treatment calcium polyphosphate was mixed with urea so that a coating of polyphosphate on the urea was formed (Example 24). The urea-calcium polyphosphate product of this invention shows increased yields at lower doses of nitrogen. In one trial (Table 1a) rice yield using the product of this invention was 14.7% higher than urea at only 80% the dosage of urea. In another trial with rice (FIG. 2*b*), yield was 12% higher at 80% of urea dosage and 8.5% higher at 70% urea dosage. Spinach yield increased by 8.6% over urea when urea-calcium polyphosphate of this invention was used with a 40% reduced dosage of nitrogen (FIG. 2*c*). In yet another trial with onion, yield of tuber increased by 7.6% and 7.4% with urea-calcium polyphosphate of this invention using 80% and 70% of the dosage of nitrogen compared to urea. These trials show the improvement in efficiency achieved with the urea-polyphosphate complex compared to unreacted urea with calcium polyphosphate.

The three features consisting of reduced water solubility, lower ammonia volatilization and lower nitrate production provide environmental benefits; field trials provide the economic benefits of the product of this invention.

Example 2a: Urea Reacted with Magnesium Polyphosphate (Urea:Mgpp:Starch:Water=100:18:5:2.5)

Technical grade phosphoric acid (60% $P_2O_5$) weighing 552 g was taken in a glass beaker, immersed in an oil bath and heated to 135° C. A slurry of 14 g magnetite (69 wt. % Fe) in 14 mL water was added with stirring. The reaction was endothermic, and temperature reached 140° C. Extensive bubbling occurred. Then 46 g magnesite (51 wt. % Mg) was added with stirring and heating continued till the temperature of the liquid was 154° C. The heating was discontinued, and 100 mL water was added to the liquid. The product was neutralized with a magnesite slurry containing 230 g magnesite in 600 mL water. Neutralized product was dried at 80° C. and powdered to less than 100 mesh size. The magnesium polyphosphate has 16.1 wt. % Mg, 1.1 wt. % Fe, 37.5 wt. % $P_2O_5$. It has a pH of 6.0, water solubility of $P_2O_5$ was 12 wt. % of total $P_2O_5$ and solubility in 2% citric acid is 99 wt. % of total $P_2O_5$.

100 g urea (46% N) was mixed with 2.5 mL water in a glass beaker and placed in an oil bath. It was heat with constant stirring, till the temperature reached 130° C.; at this temperature urea melted and a clear solution was obtained. 5 g starch was added to this clear liquid and stirred. Subsequently, 18 g magnesium polyphosphate powder was added and heating was continued till a temperature of 125° C. was attained. At this stage the liquid bubbled due to evolution of water as steam and faint smell of ammonia was also observed. The beaker was removed from the oil bath and the liquid was poured into trays to cool. On cooling to room temperature, a solid was obtained. The solid was ground in a grinder. It was leached with water and the nitrogen in the residue was determined as described in Example 2.

This fertilizer has a composition, 37.4 wt. % N (81.3 wt. % urea), 5.5 wt. % $P_2O_5$, 2.4 wt. % Mg. The molar ratio of N:P in this product is 34.5:1 and the molar ratio of N:Ca is 27.1:1. It has 22% urea in insoluble form. The residue after leaching contained 48.9% urea (22.5% N), 12.8 wt. % $P_2O_5$, 4.3 wt. % Mg. The molar ratio of N:P in this leached product is 8.9:1 and the molar ratio of N:Mg is 9.1:1. When 50 mg was leached with 50 mL citric acid added dropwise for 20 min, no urea was detected in the residue. The filtrate when analyzed for phosphorus showed 99.8 wt. % P was solubilized. When 50 mg of the fertilizer sample was leached with 50 mL 0.2 wt. % citric acid in a period of 20 min, no urea was detected in the residue. The filtrate when analyzed for phosphorus showed 87 wt. % P was solubilized.

Example 2b: Urea Reacted with Magnesium Polyphosphate and Washed (Urea:Mgpp:Starch:Water=100:18:5:2.5)

The product of Example 2a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 46.7 wt % urea (21.5% N), 22.2 wt. % P205, 7.4 wt. % Mg. The N:P molar ratio of this product is 4.9:1 and the N:Ca molar ratio is 5.0:1. This product has solubility in 0.2 wt. % citric acid of 98% of total urea. It has a higher content of P compared to products in previous 2a and can therefore be used as a N—P combined fertilizer, providing both nitrogen and phosphate to crops.

Example 3a: Urea Reacted with Iron Polyphosphate (Urea:Fepp:Starch:Water=100:18:5:2.5)

Technical grade phosphoric acid (60% $P_2O_5$) weighing 164.4 g was taken in a glass beaker. A slurry of 40 g magnetite (69 wt. % Fe) in 40 mL water was added with stirring. The reaction was exothermic, and temperature reached 85° C. Extensive bubbling occurred. The reaction was then frozen by addition of 100 mL of water. When temperature fell to 65° C. a slurry of 38 g magnesite (51 wt. % Mg) was added with stirring. The neutralized product was dried at 60° C. and powdered to less than 100 mesh size. The iron polyphosphate had 11.4 wt. % Fe, 38.3 wt. % $P_2O_5$, 7.8 wt. % Mg. It had a pH of 5.0, water solubility of Fe was 0.7 wt. % of total and solubility of Fe in 2% citric acid was 98% of total Fe.

100 g urea (46% N) was mixed with 2.5 mL water in a glass beaker and placed in an oil bath. It was heat with constant stirring, till the temperature reached 130° C.; at this temperature urea melted and a clear solution was obtained. 5 g starch was added to this clear liquid and stirred. Subsequently, 18 g iron polyphosphate powder was added, and heating was continued till a temperature of 125° C. was attained. At this stage the liquid bubbled due to evolution of water as steam and faint smell of ammonia was also observed. The beaker was removed from the oil bath and the liquid was poured into trays to cool. On cooling to room temperature, a solid was obtained. The solid was ground in a grinder. It was granulated in a pan granulator using a solution of 7 g ammonium sulfate in 12.5 mL water. The granules were dried at 55° C.

This fertilizer had a composition, 81.3 wt. % urea (37.4 wt. % N), 5.6 wt. % P205, 1.7 wt. % Fe, 1.1 wt. % Mg. The molar ratio of N:P in this product is 33.9:1 and the molar ratio of N:(Mg+Fe) is 33.4:1. It has 24.2% insoluble urea. After leaching assay with water the product contained 51.3% urea (23.6% N), 22.5 wt. % $P_2O_5$, 3.7 wt. % Fe+Mg. The molar ratio of N:P in this product is 5.3:1 and the molar ratio of N:(Mg+Fe) is 6.7:1. When 50 mg was leached with 50 mL 2 wt. % citric acid added dropwise for 20 min, the filtrate contained 99 wt % urea. The filtrate when analyzed for phosphorus showed 99.2 wt. % P was solubilized. When 50 mg of the fertilizer sample was leached with 50 mL 0.2 wt. % citric acid added dropwise in a period of 20 min, the filtrate contained 98 wt % urea. The filtrate when analyzed for phosphorus showed 88.7 wt. % P was solubilized.

Example 3b: Urea Reacted with Iron Polyphosphate and Washed (Urea:Fepp:Starch:Water=100:18:5:2.5)

The product of Example 3a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 36.5 wt % urea (16.8% N), 28 wt. % $P_2O_5$, 3.7 wt. % Mg, 5.3 wt. % Fe. The N:P molar ratio of this product is 3:1 and the N:M molar ratio is 7.4. This product has 99% urea that is soluble in 2 wt % citric acid and 95% urea that is soluble in 0.2% citric acid. The solubility of P in 2 wt % citric acid and 0.2 wt % citric acid are respectively 98% and 86% of the total P. It has a higher content of P compared to products in 3a and can therefore be used as a N—P combined fertilizer, providing both nitrogen and phosphate to crops.

Example 4a: Urea Reacted with Calcium Polyphosphate (Urea:Capp:Starch:Water=100:18:5:2.5)

Calcium polyphosphate was prepared as described in Example 1 except that it was not granulated using ammonium sulfate. Reaction of urea with this calcium polyphosphate was carried out as described in Example 1. After reaction, the beaker was removed from the oil bath and the liquid poured into trays to cool, a solid mass was obtained. This product was ground and sieved through a 2 mm sieve. The urea-polyphosphate complex has 78.6% urea (36.2% N), 7 wt. % $P_2O_5$, 3.3 wt. % Ca. The N:P molar ratio of this product is 26.1:1 and the N:Ca molar ratio is 31.5:1. It contains 26.2% insoluble urea and 73.8% soluble urea as analyzed after leaching assay. When 2 g of this product is leached with 10 mL water in a period of 8 min, the residue after drying contains 49% urea. When 50 mg was leached with 50 mL 2% citric acid added dropwise for 20 min, 99.5% of total urea was soluble. The filtrate when analyzed for phosphorus showed 99.5 wt. % P was solubilized. When 50 mg of the fertilizer sample was leached with 50 mL 0.2 wt. % citric acid in a period of 20 min, of 97.5% of total urea was soluble.

The filtrate when analyzed for phosphorus showed 82 wt. % P was solubilized. XRD of this product (Table 3) shows peaks at the following values of 2θ and d-spacings (2θ of ±0.005° error range): [11.165°, 7.9205 Å], [11.625°, 7.6081 Å, [12.795°, 6.9149 Å], [13.165°, 6.7214 Å], [22.355°, 3.9747 Å], [22.575°, 3.9365 Å], [22.725°, 3.9109 Å], [24.975°, 3.5634 Å], [26.735°, 3.3327 Å], [29.615°, 3.0148 Å], [29.765°, 2.9999 Å], [30.595°, 2.9204 Å], [32.005°, 2.7949 Å], [35.915°, 2.4991 Å], [37.505°, 2.3967 Å], [40.875°, 2.2066 Å], [41.935°, 2.1532 Å], [42.015°, 2.1493 Å], [44.675°, 2.0273 Å], [45.695°, 1.9844 Å], [49.905°, 1.8264 Å], [53.555°, 1.7102 Å], [55.305°, 1.6602 Å].

DSC of the sample is shown in Table 4. The endothermic energies (Table 4) for volatilization and reaction are significantly higher than for urea coated with calcium polyphosphate (Example 24). The peak at around 141° C. has an energy of −2.721 mW/mg for the urea-polyphosphate complex of this invention whereas the product from Examples 24, which is a product produced according to prior art invention (U.S. Pat. No. 8,999,031), is significantly lower at −1.459 mw/mg. This endotherm is produced by evaporation of absorbed water and volatilization of urea. The second peak at around 230° to 250° C. shows larger differences between the products with the endotherm peak energy at −4.418 mW/mg for the urea-polyphosphate of this invention, and −2.578 mW/mg for the product of the prior art (Examples 24). The area under the curves (that indicate total energy required for the reactions) are also greater for the product of this invention. This endotherm is due to the thermal decomposition of urea and its byproducts. Higher energy requirements for this reaction indicates stronger bonding with the polyphosphate structure leading to stabilization of the urea molecules. The third peak at above 400° C. shows even greater differences, particularly in the total energy for the endotherm; the total energy of this endotherm is 154 mJ/mg for the sample of this invention and only 6.2 mJ/mg for the product of a prior patent as produced in Example 24. This suggests that a significant proportion of the urea is strongly bound and requires much higher energies to decompose.

Example 4b: Urea Reacted with Calcium Polyphosphate and Washed (Urea:Capp:Starch:Water=100:18:5:2.5)

The product of Example 4a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 36.9 wt % urea (17% N), 27.7 wt. % P205, 12.9 wt. % Ca. The N:P molar ratio of this product is 3.1:1 and the N:Ca molar ratio is 3.8:1. In 2% and 0.2% citric acid 99 wt % and 97 wt % of urea are dissolved and 97 wt % and 80% of total P is dissolved. This product has a higher content of P compared to products in **4*a*** and can therefore be used as a N—P combined fertilizer, providing both nitrogen and phosphate to crops.

Example 5a: Urea Reacted with Calcium Polyphosphate (Urea:Capp:Starch:Water=100:18:5:10)

The process is similar to that described in Example 4a, except that the proportion of water has increased. After reaction, the beaker was removed from the oil bath and the liquid poured into trays to cool, a solid mass was obtained. This was ground to a size fraction of 2 mm to 4 mm.

The urea-polyphosphate complex has 77.6% urea (35.7% N), 7 wt. % $P_2O_5$, 3.3 wt. % Ca. The molar ratio of N:P in this product is 25.7:1 and the molar ratio of N:Ca is 31.1:1. This product has 30.4% urea in insoluble form. After leaching assay, the product composition was 51.2% urea (23.6% N), 18.8 wt. % $P_2O_5$, 8.8 wt. % Ca. The molar ratio of N:P in this product is 6.4:1 and the molar ratio of N:Ca is 7.7:1. Solubility of urea and phosphate from this product in 2% is over 99% of the total urea and phosphate. In 0.2% citric acid, 95% of total urea is dissolved and 82% of total phosphate is dissolved.

Example 5b: Urea Reacted with Calcium Polyphosphate and Washed (Urea:Capp:Starch:Water=100:18:5:10)

The product of Example 5a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 77.6 wt % urea (19.7% N), 24.9 wt. % $P_2O_5$, 11.6 wt. % Ca. The N:P molar ratio of this product is 4.0:1 and the N:Ca molar ratio is 4.8:1. This product has practically no soluble urea. Both urea and phosphate have over 99% solubility in 2% citric acid. In 0.2% citric acid, solubility of urea is 97% and phosphate is 79%. It has a higher content of P compared to products in 5a and can therefore be used as a N—P combined fertilizer, providing both nitrogen and phosphate to crops.

Example 6a: Urea Reacted with Calcium Polyphosphate (Urea:Capp:Starch:Water=100:18:5:0)

The process is similar to that described in Example 1 and 4a, except that the proportion of water has reduced to zero. After reaction, the beaker was removed from the oil bath and the liquid poured into trays to cool, a solid mass was obtained. This was finely ground.

The urea-polyphosphate complex has 77.9% urea (35.8% N), 7 wt. % $P_2O_5$, 3.3 wt. % Ca. The molar ratio of N:P in this product was 25.9:1 and the molar ratio of N:Ca is 31.2:1. This product has 24% urea in insoluble form. After leaching assay, the product composition was 45.9% urea (21.1% N), 21.2 wt. % $P_2O_5$, 9.9 wt. % Ca. The molar ratio of N:P in this product was 5.1:1 and the molar ratio of N:Ca is 6.1:1. This product therefore contains less insoluble urea compared to that in Examples 1, 4 or 5 (all of which have higher proportions of water). Solubility of urea from this product in 2% and 0.2% citric acid is over 99.5% of the total urea. Solubility of phosphate in 2% and 0.2% citric acid is 99% and 84% of total P.

Example 6b: Urea Reacted with Calcium Polyphosphate and Washed (Urea:Capp:Starch:Water=100:18:5:0)

The product of Example 6a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 33.1 wt % urea (15.2% N), 29.4 wt. % $P_2O_5$, 13.7 wt. % Ca. The N:P molar ratio of this product is 2.6:1 and the N:Ca molar ratio is 3.2:1. This product dissolves completely in 2% citric acid. In 0.2% citric acid 99% urea is removed and 77% of phosphate is dissolved. It has a higher content of P compared to products in previous 6a and can therefore be used as a N—P combined fertilizer, providing both nitrogen and phosphate to crops.

Example 7a: Urea Reacted with Calcium Polyphosphate (Urea:Capp:Starch:Water=100:18:5:5)

The process is similar to that described in Example 1 and 4a, except that the proportion of water has increased. After reaction, the beaker was removed from the oil bath and the liquid poured into trays to cool, a solid mass was obtained. This was coarsely powdered and sieved to recover granules of size 1 mm to 3 mm. The undersized materials were added to the urea-polyphosphate of the next batch while it was still in a liquid state.

The urea-polyphosphate complex has 80% urea (36.8% N), 7 wt. % $P_2O_5$, 3.3 wt. % Ca. The molar ratio of N:P is 26.6:1 and the molar ratio of N:Ca is 32.1:1. It contains 26.3% urea in insoluble form. After leaching assay with water, the residue contains 51.3% urea (23.6% N), 21 wt. % $P_2O_5$, 9.8 wt. % Ca. The molar ratio of N:P in this product is 5.7:1 and the molar ratio of N:Ca is 6.9:1. This product therefore contains more insoluble urea compared to that in Example 6 (which has no added water). Solubility of urea and phosphate from this product in 2% citric acid is over 99% of the total urea and phosphate. Solubility in 0.2 wt. % citric acid is 97% for urea and 86% for phosphate.

Example 7b: Urea Reacted with Calcium Polyphosphate and Washed (Urea:Capp:Starch:Water=100:18:5:5)

The product of Example 7a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 38.7 wt % urea (17.8% N), 26.9 wt. % $P_2O_5$, 12.6 wt. % Ca. The N:P molar ratio of this product is 3.4:1 and the N:Ca molar ratio is 4.1:1. It has a higher content of P compared to products in 7a and can therefore be used as a N—P combined fertilizer, providing both nitrogen and phosphate to crops.

Example 8a: Urea Reacted with Calcium Polyphosphate (Urea:Capp:Starch:Water=100:18:0:2.5)

The process is similar to that described in Example 1 and 4a, except that the proportion of starch has reduced to zero. After reaction, the beaker was removed from the oil bath and the liquid poured into trays to cool, a solid mass was obtained. This was finely ground.

The urea-polyphosphate complex has 83.6 wt. % urea (38.5% N), 7.3 wt. % $P_2O_5$, 3.4 wt. % Ca. This product contains 11.8% of total urea in the insoluble form and 88.2% as soluble urea. This product therefore contains lower percentage of insoluble urea compared to that in Example 4a (which has added starch). The N:P molar ratio of this product is 26.6:1 and the N:Ca molar ratio is 32.2:1. After leaching analysis with water, the residue contains 37.6 wt. % urea (17.3% N), 7.3% $P_2O_5$, 15.3% Ca. Solubility of urea and phosphate from this product in 2% citric acid is over 99.5% of the total urea and phosphate.

Example 8b: Urea Reacted with Calcium Polyphosphate and Washed (Urea:Capp:Starch:Water=100:18:0:2.5)

The product of Example 8a was mixed with water (water 1.2 times the weight of solid) and the water was removed by centrifugation. Urea in the washings was recovered by drying and reused for the next batch of fertilizer. The washed product was dried and ground.

The urea-polyphosphate complex has 20.9 wt % urea (9.6% N), 38.0 wt. % $P_205$, 17.7 wt. % Ca. The N:P molar ratio of this product is 1.3:1 and the N:Ca molar ratio is 1.6:1. It has a higher content of P compared to products in 8a and can therefore be used as a N—P combined fertilizer, providing both nitrogen and phosphate to crops. In 2 wt. % citric acid, dissolution of urea and phosphate is over 99%. In 0.2% citric acid, dissolution of urea is 98.5% and phosphate is 94%.

Example 9a: Urea Reacted with Calcium Polyphosphate (Urea:Capp:Starch:Water=100:18:2.5:2.5)

The process is similar to that described in Example 1 and 4a, except that the proportion of starch has reduced to 2.5. After reaction, the beaker was removed from the oil bath and the liquid poured into trays to cool, a solid mass was obtained. This was finely ground.

The urea-polyphosphate complex has 81.2% urea (37.4% N), 7.2 wt. % $P_2O_5$, 3.3 wt. % Ca. The N:P molar ratio of this product is 26.4:1 and the N:Ca molar ratio is 31.9:1. This product contains 20.8% insoluble urea and the rest as soluble urea. This product therefore contains higher percentage of insoluble urea compared to that in Example 8 (which has no added starch). After leaching assay with water, the residue contains 47.4 wt. % urea (21.8% N), 24.2 wt. % $P_2O_5$, 11.3 wt. % Ca. The N:P molar ratio of this product is 4.6:1 and the N:Ca molar ratio is 5.5:1. In 2 wt. % citric acid over 99% urea and phosphate are dissolved; in 0.2% citric acid 98% urea and 89% phosphate is dissolved.

Example 9b: Urea Reacted with Calcium Polyphosphate and Washed (Urea:Capp:Starch:Water=100:18:2.5:2.5)

The product of Example 9a was mixed with water (water 1.4 times the weight of solid) and the water was removed by centrifugation. Urea in the washings was recovered by drying and reused for the next batch of fertilizer. The washed product was dried and ground.

The urea-polyphosphate complex has 29.3 wt % urea (13.5% N), 32.6 wt. % $P_205$, 15.2 wt. % Ca. The N:P molar ratio of this product is 2.1:1 and the N:Ca molar ratio is 2.5:1. It has a higher content of P compared to products in 9a and can therefore be used as a N—P combined fertilizer, providing both nitrogen and phosphate to crops.

Example 10a: Urea Reacted with Calcium Polyphosphate (Urea:Capp:Starch:Water=100:18:7.5:2.5)

The process is similar to that described in Example 1 and 4a, except that the proportion of starch has increased to 7.5. After reaction, the beaker was removed from the oil bath and the liquid poured into trays to cool, a solid mass was obtained. This was coarsely powdered and sieved to size fraction 2 mm to 4 mm. The undersized materials were recycled by adding to the urea-polyphosphate of the subsequent batch, while it was still in a liquid state.

The urea-polyphosphate complex has 75 wt. % urea (34.5 wt. % N), 6.9 wt. % $P_205$, 3.2 wt. % Ca. The N:P molar ratio of this product is 25.4:1 and the N:Ca molar ratio is 30.7:1. This product contains 40.5% insoluble urea. This product therefore contains higher percentage of insoluble urea compared to that in Examples 4, 8 and 9 (which have lesser proportions of added starch). After leaching assay with water, the residue contains 54.9 wt. % urea (25.3% N), 15.6 wt. % $P_2O_5$, 7.3 wt. % Ca. The N:P molar ratio of this product is 8.2:1 and the N:Ca molar ratio is 9.9:1. Solubility of urea from this product in 2% and 0.2% citric acid is 99.5 and 98.7% of the total urea and solubility of the P is 97% and 80.9% respectively.

Example 10b: Urea Reacted with Calcium Polyphosphate and Washed (Urea:Capp:Starch:Water=100:18:7.5:2.5)

The product of Example 10a was mixed with water (water 1.1 times the weight of solid) and the water was removed by centrifugation. Urea in the washings was recovered by drying and reused for the next batch of fertilizer. The washed product was dried and ground.

The urea-polyphosphate complex has 46.9 wt % urea (21.6% N), 21.5 wt. % $P_2O_5$, 10 wt. % Ca. The N:P molar ratio of this product is 5.1:1 and the N:Ca molar ratio is 6.1:1. It has a higher content of P compared to products in 10a and can therefore be used as a N—P combined fertilizer, providing both nitrogen and phosphate to crops.

Example 11a: Urea Reacted with Calcium Polyphosphate (Urea:Capp:Starch:Water=100:15:5:2.5)

The process is similar to that described in Examples 1 and 4a, except that the proportion of calcium polyphosphate has reduced to 15. After reaction, the beaker was removed from the oil bath and the liquid poured into trays to cool, a solid mass was obtained. This was finely ground.

The urea-polyphosphate complex has 79.3 wt. % urea (36.5 wt. % N), 6 wt. % $P_205$, 2.8 wt. % Ca. The N:P ratio of this product is 30.8:1 and the molar ratio of N:Ca is 37.2:1. This product contains 20.5% insoluble urea and 79.5% soluble urea. This product therefore contains lower percentage of insoluble urea compared to that in Examples 4 (which has higher proportions of added calcium polyphosphate). After leaching assay with water, the residue contains 44 wt. % urea (20.2% N), 19.5 wt. % $P_2O_5$, 9.1 wt. % Ca. The N:P molar ratio of this product is 5.3:1 and the N:Ca molar ratio is 6.4:1. Solubility of urea and phosphate from this product in 2% citric acid is over 99% of the total urea and phosphate.

Example 11b: Urea Reacted with Calcium Polyphosphate and Washed (Urea:Capp:Starch:Water=100:15:5:2.5)

The product of Example 11a was mixed with water (water 1.2 times the weight of solid) and the water was removed by centrifugation. Urea in the washings was recovered by drying and reused for the next batch of fertilizer. The washed product was dried and ground.

The urea-polyphosphate complex has 37.1 wt % urea (17.1% N), 27.4 wt. % $P_2$05, 12.8 wt. % Ca. The N:P molar ratio of this product is 3.2:1 and the N:Ca molar ratio is 3.8:1. It has a higher content of P compared to products in 11a and can therefore be used as a N—P combined fertilizer, providing both nitrogen and phosphate to crops.

Example 12a: Urea Reacted with Calcium Polyphosphate (Urea:Capp:Starch:Water=100:25:5:2.5)

The process is similar to that described in Example 4a, except that the proportion of calcium polyphosphate has increased to 25. After reaction, the beaker was removed from the oil bath and the liquid poured into trays to cool, a solid mass was obtained. This was finely ground.

The urea-polyphosphate complex has 75.7 wt. % urea (34.8 wt. % N), 9.2 wt. % $P_2O_5$, 4.3 wt. % Ca. The N:P ratio of this product is 19.1 and the N:Ca mole ratio is 23.1:1. This product contains 24.9% insoluble urea. This product contains lower percentage of insoluble urea compared to that in Example 4a (although it has higher proportions of added calcium polyphosphate). This could be because the added starch and water have not proportionately increased. After leaching assay with water, the residue contains 43.6 wt. % urea (20.1% N), 27.8 wt. % $P_2O_5$, 13 wt. % Ca. The N:P molar ratio of this product is 3.7:1 and the N:Ca molar ratio is 4.4:1. Solubility of urea from this product in 2% and 0.2% citric acid is over 99% of the total urea; solubility in 0.2% citric acid is 96% of total urea and 82% of total P.

Example 12b: Urea Reacted with Calcium Polyphosphate and Washed (Urea:Capp:Starch:Water=100:25:5:2.5)

The product of Example 12a was mixed with water (water 1.1 times the weight of solid) and the water was removed by centrifugation. Urea in the washings was recovered by drying and reused for the next batch of fertilizer. The washed product was dried and ground.

The urea-polyphosphate complex has 30.4 wt % urea (14% N), 31.3 wt. % $P_2$05, 14.6 wt. % Ca. The N:P molar ratio of this product is 2.3:1 and the N:Ca molar ratio is 2.7:1. It has a higher content of P compared to products in 12a and can therefore be used as a N—P combined fertilizer, providing both nitrogen and phosphate to crops.

Example 13a: Urea Reacted with Calcium Polyphosphate (Urea:Capp:Starch:Water=100:30:5:2.5)

The process is similar to that described in Examples 1 and 4a, except that the proportion of calcium polyphosphate has increased to 30. After reaction, the beaker was removed from the oil bath and the liquid poured into trays to cool, a solid mass was obtained. This was finely ground.

The urea-polyphosphate complex has 74.7 wt. % urea (34.3 wt. % N), 10.7 wt. % $P_2O_5$, 5 wt. % Ca. The N:P ratio of this product is 16.3:1 and the N:Ca molar ratio is 19.7:1. This product has 26.6% insoluble urea. This product does not contain higher percentage of insoluble urea compared to that in Examples 4 (although it has higher proportions of added calcium polyphosphate). This could be because there was not enough starch per unit of urea to produce a larger number of crosslinkages. After leaching assay with water, the residue contains 44 wt. % urea (20.2% N), 31.8 wt. % $P_2O_5$, 14.9 wt. % Ca. The N:P molar ratio of this product is 3.2:1 and the N:Ca molar ratio is 3.9:1. In 2% citric acid the solubility of urea and P from this product is over 99% and in 0.2% citric acid the solubility is 96% for urea and 78% for phosphate.

Example 13b: Urea Reacted with Calcium Polyphosphate and Washed (Urea:Capp:Starch:Water=100:30:5:2.5)

The product of Example 13a was mixed with water (water 1.6 times the weight of solid) and the water was removed by centrifugation. Urea in the washings was recovered by drying and reused for the next batch of fertilizer. The washed product was dried and ground.

The urea-polyphosphate complex has 28.7 wt % urea (13.2% N), 32.4 wt. % $P_2$05, 15.1 wt. % Ca. The N:P molar ratio of this product is 2.1:1 and the N:Ca molar ratio is 2.5:1. It has a higher content of P compared to products in 13a and can therefore be used as a N—P combined fertilizer, providing both nitrogen and phosphate to crops.

Example 14a: Urea Reacted with Calcium Polyphosphate (Urea:Capp:Starch:Water=100:25:7:3.5)

The process is similar to that described in Examples 1 and 4a, except that the proportion of starch and water have also been increased to maintain it approximately in the same ratio with respect to calcium polyphosphate as in Example 4a. The reaction was done till the temperature reached 120° C.; beyond this temperature, the suspension became too dense for stirring and began to solidify. After reaction, the beaker was removed from the oil bath and the liquid poured into trays to cool, a solid mass was obtained. This was coarsely powdered and sieved to size fraction 1 mm to 3 mm. The undersized materials were recycled by adding to the urea-polyphosphate of the subsequent batch, while it was still in a liquid state.

The urea-polyphosphate complex has 72.8 wt. % urea (33.5 wt. % N), 9.1 wt. % $P_2O_5$, 4.2 wt. % Ca. The N:P molar ratio of this product is 18.7:1 and the N:Ca molar ratio is 22.6:1. This product has 32.4% of total urea as insoluble urea and 67.6% urea in soluble form. This product contains higher percentage of insoluble urea compared to that in Examples 12a (which has same proportion of polyphosphate but lesser proportions of starch and water). Therefore, starch and water have improved urea complexation with the calcium polyphosphate. However, this product has lower insoluble urea compared to Example 4a though the latter has lower ratio of calcium polyphosphate. This is possibly because the reactants could not be heated up to the desired temperature of around 123° C. due to thickening; therefore, the reaction is probably incomplete. After leaching assay with water, the residue contains 46.4 wt. % urea (21.4% N), 23.6 wt. % $P_2O_5$, 11 wt. % Ca. The N:P molar ratio of this product is 4.6:1 and the N:Ca molar ratio is 5.5:1. In 2% citric acid the solubility of urea and P from this product is over 98% and in 0.2% citric acid the solubility is 97% for urea and 81% for phosphate.

Example 14b: Urea Reacted with Calcium Polyphosphate and Washed (Urea:Capp:Starch:Water=100:25:7:3.5)

The product of Example 14a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 31.5 wt % urea (14.5% N), 29.7 wt. % $P_2$05, 13.9 wt. % Ca. The N:P molar ratio of this product is 2.5:1 and the N:Ca molar ratio is 3:1. It has a higher content of P compared to products in 14a and can therefore be used as a N—P combined fertilizer, providing both nitrogen and phosphate to crops.

Example 15a: Urea Reacted with Calcium Polyphosphate (Urea:Capp:Starch:Water=100:30:8.33:4.2)

The process is similar to that described in Examples 1 and 4a, except that the proportion of starch and water have also been increased to maintain it approximately in the same ratio with respect to calcium polyphosphate, as in Example 4a. The reaction was done till the temperature reached 118° C.; beyond this temperature, the suspension became too dense for stirring and began to solidify. After reaction, the beaker was removed from the oil bath and the liquid poured into trays to cool, a solid mass was obtained. This was coarsely powdered and sieved to obtain granules of size fraction 3 mm to 5 mm. The undersized materials were recycled by adding to the urea-polyphosphate of the subsequent batch, while it was still in a liquid state.

The urea-polyphosphate complex has 72.4 wt. % urea (33.3 wt. % N), 10.4 wt. % $P_2O_5$, 4.9 wt. % Ca. The N:P molar ratio of this product is 16.2:1 and the N:Ca molar ratio is 19.6:1. This product contains 65.4% soluble urea (35.6% insoluble urea). This product contains a somewhat higher percentage of insoluble urea compared to that in Example 14. Therefore, increasing the proportions of starch and water, increases the binding of urea with the polyphosphate. After leaching assay with water, the residue contains 47.5 wt. % urea (21.9% N), 27.3 wt. % $P_2O_5$, 12.8 wt. % Ca. The N:P molar ratio of this product is 4.1:1 and the N:Ca molar ratio is 4.9:1. In 2% and 0.2% citric acid over 97% urea is released and the release of phosphate is 95% and 77% respectively. Due to larger amounts of polyphosphate as well as starch, dissolution of polyphosphate is reduced in very dilute (0.2%) citric acid.

Example 15b: Urea Reacted with Calcium Polyphosphate and Washed (Urea:Capp:Starch:Water=100:30:8.33:4.2)

The product of Example 15a was mixed with water (water 1.5 times the weight of solid) and the water was removed by centrifugation. Urea in the washings was recovered by drying and reused for the next batch of fertilizer. The washed product was dried and ground.

The urea-polyphosphate complex has 27.8 wt % urea (12.8% N), 31.3 wt. % $P_2$05, 14.6 wt. % Ca. The N:P molar ratio of this product is 2.1:1 and the N:Ca molar ratio is 2.5:1. It has a higher content of P compared to products in 15a and can therefore be used as a N—P combined fertilizer, providing both nitrogen and phosphate to crops.

Example 16: Urea Reacted with Calcium Polyphosphate, Granulating without an Added Binder (Urea:Capp:Starch:Water=100:18:5:2.5)

The process is similar to that described in Example 1, except that the final product was prepared by granulating using water alone.

The urea-polyphosphate complex has 78.9 wt. % urea (36.3 wt. % N), 7 wt. % $P_2O_5$, 3.3 wt. % Ca. The N:P molar ratio of this product is 27.7:1 and the molar ratio of N:Ca is 31.6:1. The product contains 77.2% soluble urea (22.8% insoluble urea). This product contains lower percentage of insoluble urea compared to that in Examples 1 wherein ammonium sulfate has been used as a granulation aid. After leaching assay with water, the residue contains 46 wt. % urea (21.1% N), 22.1 wt. % $P_2O_5$, 10.3 wt. % Ca. The N:P molar ratio of this product is 4.9:1 and the N:Ca molar ratio is 5.9:1. In 2% and 0.2% citric acid over 98% urea is released and the release of phosphate is 95% and 77% respectively.

Example 17: Urea Reacted with Calcium Polyphosphate, Granulating with Urea as an Added Binder (Urea:CaPP:Starch:Water=100:18:5:2.5)

The process is similar to that described in Example 1, except that the final product was prepared by granulating using urea solution.

The urea-polyphosphate complex has 82 wt. % urea (37.7 wt. % N), 6.6 wt. % $P_2$05, 3.1 wt. % Ca. The N:P molar ratio of this product is 28.8:1 and the N:Ca molar ratio is 34.7:1. The product contains 78.6% soluble urea and 21.4% insoluble urea. This product contains lower percentage of insoluble urea compared to that in Example 1 wherein ammonium sulfate has been used as a granulation aid. After leaching assay with water, the residue contains 49.4 wt. % urea (22.7% N), 24.3 wt. % $P_2O_5$, 11.4 wt. % Ca. The N:P molar ratio of this product is 4.7:1 and the N:Ca molar ratio is 5.7:1. In 2% and 0.2% citric acid over 97% urea is released and the release of phosphate in 2% and 0.2% citric acid is 94% and 79% respectively.

Example 18: Urea Reacted with Calcium Polyphosphate, Granulating with Ammonium Sulfate as an Added Binder (Urea:CaPP:Starch:Water=100:15:5:2.5)

The process is similar to that described in Example 1, except that the ratio of calcium polyphosphate was reduced to 15.

The urea-polyphosphate complex has 78.9 wt. % urea (36.3 wt. % N), 6 wt. % $P_2O_5$, 2.8 wt. % Ca. The N:P ratio of this product is 30.7:1 and the molar ratio of N:Ca is 37:1. This product contains 82.3% urea in soluble form and 17.7% in insoluble form. This product contains lower percentage of insoluble urea compared to that in Example 1 wherein a higher proportion of calcium polyphosphate has been used. After leaching assay with water, the residue contains 39.9 wt. % urea (18.3% N), 20.5 wt. % $P_2O_5$, 9.6 wt. % Ca. The N:P molar ratio of this product is 4.5:1 and the N:Ca molar ratio is 5.5:1. Solubility of urea 2% and 0.2% citric acid is respectively 99.5% and 98.5% and solubility of phosphate is 99.6% and 89.2% respectively.

Example 19: Urea Reacted with Calcium Polyphosphate, Granulating with Ammonium Sulfate as an Added Binder (Urea:CaPP:Starch:Water=100:25:5:2.5)

The process is similar to that described in Example 1, except that the ratio of calcium polyphosphate was increased to 25.

The urea-polyphosphate complex has 75.6 wt. % urea (34.8 wt. % N), 9.2 wt. % $P_2O_5$, 4.3 wt. % Ca. The N:P molar ratio of this product is 19.1:1 and the N:Ca molar ratio is 23.1:1. This product has 79.5% of total urea in soluble form and 20.5% of total in insoluble form and. This product contains lower percentage of insoluble urea compared to that in Example 1 wherein a lower proportion of calcium polyphosphate has been used. This is possibly because the reactants could not be heated up to the desired temperature of around 123° C. due to thickening; therefore, the reaction is probably incomplete. After leaching assay with water, the residue contains 38.9 wt. % urea (17.9% N), 30 wt. % $P_2O_5$, 14 wt. % Ca. The N:P molar ratio of this product is 3:1 and the N:Ca molar ratio is 3.6:1. In 2% citric acid, urea and phosphate have more than 98% solubility. In 0.2% citric acid, solubility of urea is 96% of the total and solubility of phosphate is 82% of total.

Example 20: Urea Reacted with Calcium Polyphosphate, Granulating with Ammonium Sulfate as an Added Binder (Urea:CaPP:Starch:Water=100:30:5:2.5)

The process is similar to that described in Example 1, except that the ratio of calcium polyphosphate was increased to 30.

The urea-polyphosphate complex has 72.7 wt. % urea (33.4 wt. % N), 10.7 wt. % $P_2O_5$, 5 wt. % Ca. The N:P molar ratio of this product is 15.9:1 and the N:Ca molar ratio is 19.2:1. This product contains 77% of total urea in soluble form and 23% in insoluble form. This product contains lower percentage of insoluble urea compared to that in Example 1 wherein a lower proportion of calcium polyphosphate has been used. This is possibly because the reactants could not be heated up to the desired temperature of around 123° C. due to thickening; therefore, the reaction is probably incomplete. After leaching assay with water, the residue contains 37.9 wt. % urea (17.5% N), 32.7 wt. % $P_2O_5$, 15.3 wt. % Ca. The N:P molar ratio of this product is 2.7:1 and the N:Ca molar ratio is 3.3:1.

Example 21: Urea Reacted with Calcium Polyphosphate, Granulating with Ammonium Sulfate (Urea:CaPP:Starch:Water=100:18:5:2.5)

The process is similar to that described in Example 1 and 4a, except that the final product was prepared by co-granulating 100 g product of Example 4a with 40 g of ammonium sulfate and a spray of 14 mL water. Addition of ammonium sulfate adds sulfur nutrient in the product.

The granule has average size between 1 mm and 3 mm. The granular product has 65.6% urea, 33.3% N (ammonium+urea N), 5.5% $P_2O_5$, 2.7% Ca and 4% S. The molar ratio of N:P in this product is 23.8:1 and the molar ratio of N:Ca is 35.2:1. This product contains 50.2% of total urea in soluble form and 49.8% of total urea in insoluble form. After leaching assay with water, the residue contains 48.7 wt. % urea (22.4% N), 12.9 wt. % $P_2O_5$, 6 wt. % Ca. The N:P molar ratio of this product is 8.8:1 and the N:Ca molar ratio is 10.6:1. In 2% citric acid, over 98% of total urea and phosphate are dissolved. In 0.2% citric acid, 97% of total urea and 84% of total phosphate are dissolved.

Example 22: Urea Reacted with Calcium Polyphosphate, Granulating with Potassium Chloride (Urea:CaPP:Starch:Water=100:18:5:2.5)

The process is similar to that described in Example 1 and 4a, except that the final product was prepared by co-granulating 100 g product of Example 4a with 40 g of potassium chloride and a spray of 15 mL water. The addition of KCl provides added K nutrition to the crop. It also improves granulation.

The granule has average size between 4 mm and 7 mm. The granular product has 65% urea (29.9% N), 5.4% $P_2O_5$, 2.7% Ca and 8.7% K. The molar ratio of N:P in this product is 21.4:1 and the molar ratio of N:(Ca+K) is 7.4:1. This product contains 35.5% of total urea in soluble form and 64.5% of total urea in insoluble form. After leaching assay with water, the residue contains 54.5 wt. % urea (25.1% N), 11.2 wt. % $P_2O_5$, 5.2 wt. % Ca. The N:P molar ratio of this product is 11.3:1 and the N:Ca molar ratio is 13.7:1. In 2% citric acid, over 98% urea and phosphate are dissolved. In 0.2% citric acid, 98% urea and 82% phosphate are dissolved.

Example 23: Urea Reacted with Calcium Polyphosphate, Granulating with Diammonium Phosphate (Urea:CaPP:starch:water=100:18:5:2.5)

The process is similar to that described in Example 1 and 4a, except that the final product was prepared by co-granulating 100 g product of Example 4a with 40 g of diammonium phosphate (DAP) and a spray of 17 mL water. Inclusion of DAP increases P content of the product and will provide sufficient P to the crop, in addition to N.

The granule has average size between 3 mm and 5 mm. The granular product has 65% urea (32.8% N), 13.1% $P_2O_5$, 2.7% Ca. The molar ratio of N:P in this product is 23.4:1 and the molar ratio of N:Ca is 34.7:1. This product contains 30.1% of total urea in soluble form and 69.9% of total urea in insoluble form. After leaching assay with water, the residue contains 56.5 wt. % urea (26% N), 10.7 wt. % $P_2O_5$, 5 wt. % Ca. The molar ratio of N:P in this product is 12.3:1 and the molar ratio of N:Ca is 14.8:1. In 2% citric acid, over 98% urea and phosphate are dissolved. In 0.2% citric acid, 98% urea and 76% phosphate are dissolved.

Example 24: Urea Coated with Calcium Polyphosphate (Urea:CaPP=100:30)

This process is for purposes of comparison of product with prior art invention. It follows the process described in Example 25 of U.S. Pat. No. 8,999,031. As described therein, 100 g urea was taken in a dry glass jar and 30 g of calcium polyphosphate was added to it. It was shaken by hand to mix the contents.

The product contains 77 wt. % urea (35.4 wt. % N), 11.1 wt. % $P_2O_5$, 4.3 wt. % Ca. After leaching with water as described in example 1, urea could not be detected in the residue. The filtrate contained 99.7% of total urea. All urea was solubilized. The urea could not be retained because it was not reacted with the calcium polyphosphate and therefore, it dissolved and was removed in solution.

XRD of this sample is shown in Table 3. Except for one peak at [22.262°, 3.99006 Å] due to urea, all other major reflections are different from those of the products of the present invention.

DSC features of this sample is presented in Table 4. Endothermic energies required, are much lower for this product than for the sample of the present invention. Urea volatilization and decompositions requires greater energy in the urea-polyphosphate complex of this invention (Example 4a) compared to the product of the prior patent (this Example 24). Therefore, urea is in a chemically altered form in the complex as compared to the prior patent.

Example 25a: Urea Reacted with Calcium Polyphosphate (Urea:Capp:Starch:Water=100:18:7:10)

The process is similar to that described in Examples 1 and 4a, except that the proportions of starch and water have increased. After reaction, the beaker was removed from the oil bath and the liquid poured into trays to cool, a solid mass was obtained. This was finely ground.

The urea-polyphosphate complex has 79% urea (36.4% N), 6.9 wt. % $P_2O_5$, 3.2 wt. % Ca. The molar ratio of N:P in this product is 26.7:1 and the molar ratio of N:Ca is 32.2:1. This product contains 61.4% of total urea in soluble form and 38.6% of total urea in insoluble form. This product therefore contains higher percentage of insoluble urea compared to that in Example 4a (which has less starch and less water). After leaching assay with water, the residue contains 59.3 wt. % urea (27.3% N), 16.8 wt. % $P_2O_5$, 7.8 wt. % Ca. The molar ratio of N:P in this product is 8.2:1 and the molar ratio of N:Ca is 9.9:1. Solubility in 2% citric acid shows 99.7% and 99.8% of total urea and P dissolved and in 0.2% citric acid 99.2% of total urea and 85.7% of total P was dissolved.

Example 25b: Urea Reacted with Calcium Polyphosphate and Washed (Urea:Capp:Starch:Water=100:18:7:10)

The product of Example 25a was mixed with water (water 1.3 times the weight of solid) and the water was removed by centrifugation. Urea in the washings was recovered by drying and reused for the next batch of fertilizer. The washed product was dried and ground.

The urea-polyphosphate complex has 49.8 wt % urea (22.9% N), 20.7 wt. % P205, 9.7 wt. % Ca. The N:P molar ratio of this product is 5.6:1 and the N:Ca molar ratio is 6.8:1. It has a higher content of P compared to products in 26a and can therefore be used as a N—P combined fertilizer, providing both nitrogen and phosphate to crops.

TABLE 1

Composition of products of the examples

Products produced with variation in water

| Example | Weight ratio in reaction system Urea-CaPP-water-starch | Composition of product Wt. % N | Wt. % P | Mole ratio N:P | Wt. % Ca | Mole ratio N:Ca | Composition of leached product (after leaching assay) % N | Wt % P | Mole ratio N:P | Wt. % cations (M) | Mole ratio N:M |
|---|---|---|---|---|---|---|---|---|---|---|---|
| 6a | 100-18-0-5 | 35.8 | 3.8 | 25.9 | 3.3 | 31.2 | 21.1 | 9.2 | 5.1 | 9.9 | 6.1 |
| 6b | 100-18-0-5 | 15.2 | 12.8 | 2.6 | 13.7 | 3.2 | | | | | |
| 4a | 100-18-2.5-5 | 36.2 | 3.8 | 26.1 | 3.3 | 31.5 | 22.6 | 9.0 | 5.6 | 9.6 | 6.7 |
| 4b | 100-18-2.5-5 | 17.0 | 12.1 | 3.1 | 12.9 | 3.8 | | | | | |
| 7a | 100-18-5-5 | 36.8 | 3.1 | 26.6 | 3.3 | 32.1 | 23.6 | 9.2 | 5.7 | 9.8 | 6.9 |
| 7b | 100-18-5-5 | 17.8 | 11.8 | 3.4 | 12.6 | 4.0 | | | | | |
| 5a | 100-18-10-5 | 35.7 | 3.1 | 25.7 | 3.3 | 31.1 | 23.6 | 8.2 | 6.4 | 8.8 | 7.7 |
| 5b | 100-18-10-5 | 19.7 | 10.9 | 4.0 | 11.6 | 4.8 | | | | | |

Products with different polyphosphates

| Example | Wt. ratio in reaction system Urea-MgPP-water-starch | Composition of product Wt. % N | Wt. % P | Mole ratio N:P | Wt. % Mg | Mole ratio N:Mg | Composition of leached product (after leaching assay) Wt. % N | Wt % P | Mole ratio N:P | Wt. % cations (M) | Mole ratio N:M |
|---|---|---|---|---|---|---|---|---|---|---|---|
| 2a | 100-18-2.5-5 | 37.4 | 2.4 | 34.5 | 2.4 | 27.0 | 22.5 | 5.6 | 8.9 | 4.3 | 9.1 |
| 2b | 100-18-2.5-5 | 21.5 | 9.7 | 4.9 | 7.4 | 5.0 | | | | | |

| Example | Urea-FePP-water-starch | % Urea | % P | ratio N:P | Wt. % M (Fe + Mg) | Mole ratio N:M | | | | | |
|---|---|---|---|---|---|---|---|---|---|---|---|
| 3a | 100-18-2.5-5 | 37.4 | 2.4 | 33.9 | 2.8 | 33.4 | 23.6 | 9.8 | 5.3 | 3.7 | 6.7 |
| 3b | 100-18-2.5-5 | 16.8 | 12.2 | 3.0 | 9.0 | 7.4 | | | | | |

Products produced with variation in starch

| Example | Weight ratio in reaction system Urea-CaPP-water-starch | Composition of product Wt. % N | Wt. % P | Mole ratio N:P | Wt. % Ca | Mole ratio N:M | Composition of leached product (after leaching assay) Wt. % N | Wt % P | Mole ratio N:P | Wt. % cations (M) | Mole ratio N:M |
|---|---|---|---|---|---|---|---|---|---|---|---|
| 8a | 100-18-2.5-0 | 38.5 | 3.2 | 26.6 | 3.4 | 32.2 | 17.3 | 14.3 | 2.7 | 15.3 | 3.2 |
| 8b | 100-18-2.5-0 | 9.6 | 16.6 | 1.3 | 17.7 | 1.5 | | | | | |
| 9a | 100-18-2.5-2.5 | 37.4 | 3.1 | 26.4 | 3.3 | 31.9 | 21.8 | 10.6 | 4.6 | 11.3 | 5.5 |
| 9b | 100-18-2.5-2.5 | 13.5 | 14.2 | 2.1 | 15.2 | 2.5 | | | | | |
| 4a | 100-18-2.5-5 | 36.2 | 3.1 | 26.1 | 3.3 | 31.5 | 22.6 | 9.0 | 5.6 | 9.6 | 6.7 |
| 4b | 100-18-2.5-5 | 17.0 | 12.1 | 3.1 | 12.9 | 3.8 | | | | | |

TABLE 1-continued

Composition of products of the examples

| | | | | | | | | | | | |
|---|---|---|---|---|---|---|---|---|---|---|---|
| 10a | 100-18-2.5-7.5 | 34.5 | 3.0 | 25.4 | 3.2 | 30.7 | 25.3 | 6.8 | 8.2 | 7.3 | 9.9 |
| 10b | 100-18-2.5-7.5 | 21.6 | 9.4 | 5.1 | 10.0 | 6.1 | | | | | |

Products produced with variation in calcium polyphosphate ratio

| | Weight ratio in reaction | Composition of product | | | | | Composition of leached product (after leaching assay) | | | | |
|---|---|---|---|---|---|---|---|---|---|---|---|
| Example | system Urea-CaPP-water-starch | Wt. % N | Wt. % P | Mole ratio N:P | Wt. % Ca | Mole ratio N:Ca | Wt. % N | Wt. % P | Mole ratio N:P | Wt. % Ca | Mole ratio N:Ca |
| 11a | 100-15-2.5-5 | 36.5 | 2.6 | 30.8 | 2.8 | 37.2 | 20.2 | 8.5 | 5.3 | 9.1 | 6.4 |
| 11b | 100-15-2.5-5 | 17.1 | 12.0 | 3.2 | 12.8 | 3.8 | | | | | |
| 4a | 100-18-2.5-5 | 36.2 | 3.1 | 26.1 | 3.3 | 31.5 | 22.6 | 9.0 | 5.6 | 9.6 | 6.7 |
| 4b | 100-18-2.5-5 | 17.0 | 12.1 | 3.1 | 12.9 | 3.8 | | | | | |
| 12a | 100-25-2.5-5 | 34.8 | 4.0 | 19.1 | 4.3 | 23.1 | 20.1 | 12.1 | 3.7 | 13.0 | 4.4 |
| 12b | 100-25-2.5-5 | 14.0 | 13.7 | 2.3 | 14.6 | 2.7 | | | | | |
| 13a | 100-30-2.5-5 | 34.3 | 4.7 | 16.3 | 5.0 | 19.7 | 20.2 | 13.9 | 3.2 | 14.9 | 3.9 |
| 13b | 100-30-2.5-5 | 13.2 | 14.2 | 2.1 | 15.1 | 2.5 | | | | | |

Products produced with variation in calcium polyphosphate, water & starch ratios

| | Wt. ratio in reaction | Composition of product | | | | | Composition of leached product (after leaching assay) | | | | |
|---|---|---|---|---|---|---|---|---|---|---|---|
| Example | system Urea-CaPP-water-starch | Wt. % N | Wt. % P | Mole ratio N:P | Wt. % Ca | Mole ratio N:Ca | Wt. % N | Wt. % P | Mole ratio N:P | Wt. % Ca | Mole ratio N:Ca |
| 4a | 100-18-2.5-5 | 36.2 | 3.1 | 26.1 | 3.3 | 31.5 | 22.6 | 9.0 | 5.6 | 9.6 | 6.7 |
| 4b | 100-18-2.5-5 | 17.0 | 12.1 | 3.1 | 12.9 | 3.8 | | | | | |
| 14a | 100-25-3.5-7 | 33.5 | 4.0 | 18.7 | 4.2 | 22.6 | 21.4 | 10.3 | 4.6 | 11.0 | 5.5 |
| 14b | 100-25-3.5-7 | 14.5 | 13.0 | 2.5 | 13.9 | 3.0 | | | | | |
| 15a | 100-30-4.2-8.33 | 33.3 | 4.5 | 16.2 | 4.9 | 19.6 | 21.9 | 11.9 | 4.1 | 12.8 | 4.9 |
| 15b | 100-30-4.2-8.33 | 12.8 | 13.7 | 2.1 | 14.6 | 2.5 | | | | | |
| 25a | 100-18-10-7 | 36.4 | 3.0 | 26.7 | 3.2 | 32.2 | 27.3 | 7.3 | 8.2 | 7.8 | 9.9 |
| 25b | 100-18-10-7 | 22.9 | 9.1 | 5.6 | 9.7 | 6.8 | | | | | |
| 24 | 100-30 | 35.4 | 4.8 | 16.2 | 4.3 | 23.6 | ND | 20.4 | | 22.1 | |

TABLE 2

Composition of products by various granulation methods

Granulated products (Urea:CaPP:Water:Starch = 100:18:2.5:5)

| | | Composition of product | | | | | Composition of leached product (after leaching assay) | | | | |
|---|---|---|---|---|---|---|---|---|---|---|---|
| Sample | Granulation aid/added materials | Wt. % N | Wt. % P | Mole ratio N:P | Wt. % Ca | Mole ratio N:M | Wt. % N | Wt. % P | Mole ratio N:P | Wt. % Ca | Mole ratio N:M |
| 1 | AS | 36.0 | 2.9 | 27.5 | 2.6 | 39.6 | 23.4 | 8.5 | 6.1 | 9.1 | 7.3 |
| 16 | water only | 36.3 | 3.1 | 27.7 | 3.3 | 31.6 | 21.1 | 9.6 | 4.9 | 10.3 | 5.9 |
| 17 | urea | 37.7 | 2.9 | 28.8 | 3.1 | 34.7 | 22.7 | 10.6 | 4.7 | 11.4 | 5.7 |
| 21 | AS | 33.3 | 2.4 | 23.8 | 2.7 | 35.2 | 22.40 | 5.6 | 8.8 | 6.0 | 10.6 |
| 22 | KCl | 29.9 | 2.4 | 21.4 | 11.4 | 7.4 | 25.1 | 4.9 | 11.3 | 5.2 | 13.7 |
| 23 | DAP | 32.8 | 5.7 | 23.4 | 2.7 | 34.7 | 26.0 | 4.7 | 12.3 | 5.0 | 14.8 |

Granulated products (Urea:Water:Starch = 100:2.5:5)

| | | Composition of product | | | | | Composition of leached product (after leaching assay) | | | | |
|---|---|---|---|---|---|---|---|---|---|---|---|
| Example | Wt. ratio of CaPP | Wt. % N | Wt. % P | Mole ratio N:P | Wt. % Ca | Mole ratio N:Ca | Wt. % N | Wt. % P | Mole ratio N:P | Wt. % Ca | Mole ratio N:Ca |
| 18 | 15 | 36.3 | 2.6 | 30.7 | 2.8 | 37.0 | 18.3 | 9.0 | 4.5 | 9.6 | 5.5 |
| 1 | 18 | 36.0 | 2.9 | 27.5 | 2.6 | 39.6 | 23.4 | 8.5 | 6.1 | 9.1 | 7.3 |
| 19 | 25 | 34.8 | 4.0 | 19.1 | 4.3 | 23.1 | 17.9 | 13.1 | 3.0 | 14.0 | 3.6 |
| 20 | 30 | 33.4 | 4.7 | 15.9 | 5.0 | 19.2 | 17.5 | 14.3 | 2.7 | 15.3 | 3.3 |

TABLE 3

XRD of Example 24 compared with product of prior patent

| Example 4a (Urea-CaPP-complex) | | | Example 24 (Prior patent; Urea-CaPP-coat) | | |
|---|---|---|---|---|---|
| Angle | D-value | Relative Intensity | Angle | D-Value | Relative Intensity |
| 11.165° | 7.9205 | 1 | 11.677° | 7.57262 Å | 1.4 |
| 11.625° | 7.6081 | 1 | 20.969° | 4.23309 Å | 1 |
| 12.795° | 6.9149 | 1 | 22.262° | 3.99006 Å | 100 |
| 13.165° | 6.7214 | 1 | 29.315° | 3.04415 Å | 1.7 |
| 22.355° | 3.9747 | 16 | 31.629° | 2.82656 Å | 2.6 |
| 22.575° | 3.9365 | 100 | 35.516° | 2.52561 Å | 3 |
| 22.725° | 3.9109 | 25 | 45.334° | 1.99882 Å | 2.9 |
| 24.975° | 3.5634 | 38 | | | |
| 26.735° | 3.3327 | 3 | | | |
| 29.615° | 3.0148 | 7 | | | |
| 29.765° | 2.9999 | 15 | | | |
| 30.595° | 2.9204 | 3 | | | |
| 32.005° | 2.7949 | 3 | | | |
| 35.915° | 2.4991 | 7 | | | |
| 37.505° | 2.3967 | 6 | | | |
| 40.875° | 2.2066 | 2 | | | |
| 41.935° | 2.1532 | 2 | | | |
| 42.015° | 2.1493 | 3 | | | |
| 44.675° | 2.0273 | 3 | | | |
| 45.695° | 1.9844 | 2 | | | |
| 49.905° | 1.8264 | 4 | | | |
| 53.555° | 1.7102 | 2 | | | |
| 55.305° | 1.6602 | 3 | | | |

Error±0.005°: Cu$K_{\alpha}$ radiation: only peaks stronger than 1% relative intensity displayed

TABLE 4

DSC data

| Example | Sample description | Peak position | Energy of endotherm (mW/mg) | Total area under peak (mJ/mg) |
|---|---|---|---|---|
| 4 | Urea-CaPP complex | 141.7° C. | −2.721 | 50.2 mJ/mg |
| 24 | Urea-CapP coating | 141.2° C. | −1.459 | 56 mJ/mg |
| 4 | Urea-CaPP complex | 248.5° C. | −4.418 | 328 mJ/mg |
| 24 | Urea-CapP coating | 236.8° C. | −2.578 | 222 mJ/mg |
| 4 | Urea-CaPP complex | 374.7° C. | −2.878 | 199 mJ/mg |
| 24 | Urea-CapP coating | 350.4° C. | −1.724 | 97 mJ/mg |
| 4 | Urea-CaPP complex | 421.1° C. | −2.342 | 154 mJ/mg |
| 24 | Urea-CaPP coating | 408.3° C. | −1.201 | 6.2 mJ/mg |

The invention claimed is:

1. A urea-polyphosphate composition comprising urea, a polyphosphate, inorganic cations, and a water-insoluble fraction, the water-insoluble fraction having (a) a urea content of at least 5 wt %, (b) a phosphorus content in the range of 1 wt % to 20 wt. %, (c) primary inorganic cations in the range of 1 wt % to 20 wt % wherein the primary inorganic cations are selected from the group consisting of ammonium, calcium, iron, magnesium, and potassium cations and combinations thereof, (d) a molar ratio of nitrogen to the combined total of the primary inorganic cations in the range of 2:1 to 40:1, (e) a number average chain length of polyphosphate groups of 1.1 to 20 when orthophosphates are included in the number average chain length calculation, (f) a molar ratio of nitrogen to phosphorous in the range of 3:1 to 60:1, and (g) a solubility in citric acid such that (i) at least 70 wt. % of each of the total nitrogen and total phosphorous in the water-insoluble fraction is soluble in 2 wt. % citric acid, and (ii) at least 50 wt. % of each of the total nitrogen and the total phosphorous in the water-insoluble fraction is soluble in 0.2 wt. % citric acid.

2. The urea-polyphosphate composition of claim 1 wherein the phosphorus content in the water-insoluble fraction is in the range of 4 wt % to 13 wt. %.

3. The urea-polyphosphate composition of claim 1 wherein the inorganic cation content in the water-insoluble fraction is in the range of 5 wt % to 15 wt %.

4. The urea-polyphosphate composition of claim 1 wherein the primary inorganic cations are selected from the group consisting of calcium, magnesium and iron.

5. The urea-polyphosphate composition of claim 1 wherein the molar ratio of nitrogen to the combined total of the primary inorganic cations in the water-insoluble fraction is in the range of 3:1 to 15:1.

6. The urea-polyphosphate composition of claim 1 wherein the number average chain length of polyphosphate groups in the water-insoluble fraction is 1.1 to 5 when orthophosphates are included in the number average chain length calculation.

7. The urea-polyphosphate composition of claim 1 wherein the water-insoluble fraction has a solubility in citric acid such that (i) at least 70 wt. % of each of the total nitrogen and total phosphorous in the water-insoluble fraction is soluble in 0.2 wt. % citric acid.

8. The urea-polyphosphate composition of claim 1 wherein the urea-polyphosphate composition additionally comprises a cross-linking promoter containing hydroxyl groups selected from the group consisting of polysaccharides, cellulose derivatives, polyalcohols, natural gums, and combinations thereof.

9. The urea-polyphosphate composition of claim 1 wherein the urea-polyphosphate composition additionally comprises starch and the starch content is less than 20 wt % of the urea-polyphosphate composition.

10. The urea-polyphosphate composition of claim 1 wherein the water-insoluble fraction in the urea-polyphosphate composition additionally comprises micronutrients selected from the group consisting of Zn, Fe, Mn, Cu, B, Mo, and Se and combinations thereof, and the water-soluble micronutrient content of the urea-polyphosphate composition is less than 10 wt %.

11. The urea-polyphosphate composition of claim 1 wherein the urea-polyphosphate composition additionally comprises a water-soluble fraction comprising urea and the water-soluble urea content of the urea-polyphosphate is between 5 and 95 wt % of the total amount of urea comprised by the urea-polyphosphate composition.

12. The urea-polyphosphate composition of claim 1 wherein the urea-polyphosphate composition is in granular form and the granules have a screen size of at least 1 mm.

13. A fertilizer comprising the urea-polyphosphate composition of claim 1.

14. The fertilizer of claim 13 wherein the fertilizer additionally comprises an additive selected from the group consisting of ammonium sulfate, potassium chloride, diammonium phosphate, urea-formaldehyde polymers, and combinations thereof.

15. The urea-polyphosphate composition of claim 1 wherein the water-insoluble fraction is obtained by placing 2 g of the urea-polyphosphate composition on a filter paper in a funnel, leaching the urea-polyphosphate composition with 10 mL deionized water added dropwise from a burette for 8 minutes at 25° C. and collecting the solid residue.

16. The urea-polyphosphate composition of claim 1 wherein the urea-polyphosphate composition comprises 10 to 40 wt % nitrogen.

17. The urea-polyphosphate composition of claim 1 wherein the water insoluble fraction contains 30 to 60 wt % water-insoluble urea.

18. The urea-polyphosphate composition of claim 1 wherein the urea-polyphosphate composition comprises water-soluble urea and water insoluble urea, and the water-insoluble urea is 20 to 70 wt % of the combined amount of water-soluble and water-insoluble urea comprised by the urea-polyphosphate composition.

19. The urea-polyphosphate composition of claim 1 wherein the urea-polyphosphate composition comprises (i) 40 to 90 wt % urea, (ii) a water-soluble fraction comprising urea, and (iii) a water-insoluble fraction comprising urea, wherein (iv) the urea content of the water-insoluble fraction is 20 to 70 wt % of the combined amount of water-soluble and water-insoluble urea comprised by the urea-polyphosphate composition.

20. The urea-polyphosphate composition of claim 1 wherein the urea-polyphosphate composition comprises 60 to 85 wt % urea.

* * * * *